(12) United States Patent
Walker

(10) Patent No.: US 8,200,643 B2
(45) Date of Patent: Jun. 12, 2012

(54) LOCK AND TRANSACTION MANAGEMENT

(75) Inventor: Michael Leo Walker, Topeka, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/961,290

(22) Filed: Dec. 6, 2010

(65) Prior Publication Data

US 2011/0078126 A1 Mar. 31, 2011

Related U.S. Application Data

(62) Division of application No. 11/777,911, filed on Jul. 13, 2007, now Pat. No. 7,870,111, which is a division of application No. 10/428,780, filed on May 1, 2003, now Pat. No. 7,289,992.

(51) Int. Cl.
*G06F 17/30* (2006.01)

(52) U.S. Cl. .................. 707/704; 707/999.008

(58) Field of Classification Search ........................ None
See application file for complete search history.

(56) References Cited

U.S. PATENT DOCUMENTS

| | | | |
|---|---|---|---|
| 5,060,144 A | 10/1991 | Sipple et al. |
| 5,161,227 A | 11/1992 | Dias et al. |
| 5,175,852 A | 12/1992 | Johnson et al. |
| 5,202,971 A | 4/1993 | Henson et al. |
| 5,226,159 A | 7/1993 | Henson et al. |
| 5,251,317 A | 10/1993 | Iizuka et al. |
| 5,339,427 A | 8/1994 | Elko et al. |
| 5,392,433 A | 2/1995 | Hammersley et al. |
| 5,440,743 A | 8/1995 | Yokota et al. |
| 5,454,108 A | 9/1995 | Devarakonda et al. |
| 5,459,871 A | 10/1995 | Van Den Berg |
| 5,513,314 A | 4/1996 | Kandasamy et al. |
| 5,535,375 A | 7/1996 | Eshel et al. |
| 5,537,645 A | 7/1996 | Henson et al. |
| 5,613,139 A | 3/1997 | Brady |
| 5,615,373 A | 3/1997 | Ho |
| 5,682,537 A | 10/1997 | Davies et al. |
| 5,692,120 A | 11/1997 | Forman et al. |
| 5,734,909 A | 3/1998 | Bennett |
| 5,742,813 A | 4/1998 | Kavanagh et al. |
| 5,745,747 A | 4/1998 | Chang et al. |
| 5,761,659 A | 6/1998 | Bertoni |
| 5,845,117 A | 12/1998 | Fujita |
| 5,845,147 A | 12/1998 | Vishlitzky et al. |
| 5,872,981 A | 2/1999 | Waddington et al. |
| 5,890,153 A | 3/1999 | Fukuda et al. |
| 5,933,825 A | 8/1999 | McClaughry et al. |

(Continued)

FOREIGN PATENT DOCUMENTS

EP 0428006 5/1991

(Continued)

OTHER PUBLICATIONS

Bhide et al.,"A Highly Available Lock Manager for HA-NFS", Proceedings of the Summer 1992 USENIX Conference, pp. 177-184.

(Continued)

*Primary Examiner* — Jean B Fleurantin
*Assistant Examiner* — Anteneh Girma
(74) *Attorney, Agent, or Firm* — Janaki K. Davda; Konrad Raynes and Victor LLP

(57) ABSTRACT

Disclosed is a method, system, and program for lock management. Under control of a lock manager, lock request queuing is performed, heartbeat functions are performed, and state information is maintained.

18 Claims, 26 Drawing Sheets

U.S. PATENT DOCUMENTS

| | | | |
|---|---|---|---|
| 5,983,225 | A | 11/1999 | Anfindsen |
| 5,987,621 | A | 11/1999 | Duso et al. |
| 6,029,190 | A | 2/2000 | Oliver |
| 6,041,384 | A | 3/2000 | Waddington et al. |
| 6,044,404 | A | 3/2000 | Holdsworth et al. |
| 6,105,098 | A | 8/2000 | Ninose et al. |
| 6,115,715 | A | 9/2000 | Traversat et al. |
| 6,128,657 | A | 10/2000 | Okanoya et al. |
| 6,141,720 | A | 10/2000 | Jeffords et al. |
| 6,145,094 | A | 11/2000 | Shirriff et al. |
| 6,151,659 | A | 11/2000 | Solomon et al. |
| 6,173,293 | B1 | 1/2001 | Thekkath et al. |
| 6,182,186 | B1 | 1/2001 | Daynes |
| 6,192,408 | B1 | 2/2001 | Vahalia et al. |
| 6,266,785 | B1 | 7/2001 | McDowell |
| 6,275,953 | B1 | 8/2001 | Vahalia et al. |
| 6,292,860 | B1 | 9/2001 | Cochcroft, Jr. et al. |
| 6,324,571 | B1 | 11/2001 | Hacherl |
| 6,324,581 | B1 | 11/2001 | Xu et al. |
| 6,336,171 | B1 | 1/2002 | Coskrey, IV |
| 6,389,420 | B1 | 5/2002 | Vahalia et al. |
| 6,412,034 | B1 | 6/2002 | Chan |
| 6,415,089 | B2 | 7/2002 | Kato et al. |
| 6,539,446 | B1 | 3/2003 | Chan |
| 6,553,384 | B1 | 4/2003 | Frey et al. |
| 6,618,744 | B1 | 9/2003 | Simmons et al. |
| 6,668,304 | B1 | 12/2003 | Satran et al. |
| 6,697,901 | B1 | 2/2004 | Shun Chan |
| 6,757,769 | B1 | 6/2004 | Ofer |
| 6,789,204 | B2 | 9/2004 | Abdelnur et al. |
| 6,823,511 | B1 | 11/2004 | Mckenney et al. |
| 6,959,337 | B2 | 10/2005 | McLaughlin et al. |
| 7,010,554 | B2 | 3/2006 | Jiang et al. |
| 7,047,337 | B2 | 5/2006 | Armstrong et al. |
| 7,089,555 | B2 | 8/2006 | Calvignac et al. |
| 7,107,319 | B2 | 9/2006 | Chandrasekaran et al. |
| 7,174,552 | B2 | 2/2007 | Mikael et al. |
| 7,289,992 | B2 | 10/2007 | Walker |
| 7,328,263 | B1 | 2/2008 | Sadjadi |
| 7,496,574 | B2 | 2/2009 | Walker |
| 7,844,585 | B2 | 11/2010 | Walker |
| 2003/0018782 | A1 | 1/2003 | Dixon et al. |
| 2003/0066880 | A1 | 4/2003 | Ieshima et al. |
| 2003/0135537 | A1 | 7/2003 | Mikael et al. |
| 2003/0191745 | A1 | 10/2003 | Jiang et al. |
| 2003/0217092 | A1 | 11/2003 | Veselov |
| 2003/0233455 | A1 | 12/2003 | Leber et al. |
| 2004/0019892 | A1 | 1/2004 | E. et al. |
| 2004/0068563 | A1 | 4/2004 | Ahuja et al. |
| 2004/0117372 | A1 | 6/2004 | Kasman |
| 2004/0199734 | A1 | 10/2004 | Rajamani et al. |
| 2004/0221079 | A1 | 11/2004 | Goldick |
| 2006/0101081 | A1 | 5/2006 | Lin et al. |
| 2006/0167921 | A1 | 7/2006 | Grebus et al. |
| 2006/0206901 | A1 | 9/2006 | Chan |
| 2006/0212496 | A1 | 9/2006 | Romine et al. |
| 2007/0282839 | A1 | 12/2007 | Walker |
| 2008/0263549 | A1 | 10/2008 | Walker |

FOREIGN PATENT DOCUMENTS

| | | |
|---|---|---|
| EP | 0575067 | 12/1993 |
| JP | 7253950 | 10/1995 |
| JP | 08137707 | 5/1996 |
| JP | 10021098 | 1/1998 |
| TW | 513512 | 12/2002 |
| WO | 9938096 | 7/1999 |

OTHER PUBLICATIONS

Ciciani et al., "Protocol for Hybrid Centralized-Distributed Database System", IBM Technical Disclosure Bulletin, vol. 31, No. 9, Feb. 1989, pp. 474-475.

De Ferreria Rezende et al., "Transaction Identifiers in Nested Transactions; Implemention Schemes and Performance", The Computer Journal, vol. 40, No. 5, 1997; pp. 245-258.

Distributed Management Task Force, Inc. (DMTF), Specification for CIM Operations over HTTP. Status: Preliminary. DSP0200, Version 1.1, May 2, 2002, pp. 1-102, [online] retrieved Jun. 27, 2002]. Retrieved from http://www.dmtf.org/standards/documents/WBEM/DSP0200.html.

Domenici, et al., "A Protocol for Resource Locking and Deadlock Detection in a Multi-User Environment", Microprocessing and Microprogramming Aug. 27, 1989, Nos. 1/5, Amsterdam, NL; pp. 431-437.

"The HA-NFS Project Home Page ". [online] [retrieved on Jan. 7, 2002]. Retrieved from the Internet at <URL: http://www.-2.cs.cmu.edu/afs/cs.cmu.edu/user/mootaz/ftp/html/hanfs.html>.

IBM Corp., "Fine Granularity Locking to Support High Data Availability in a Client/ Server Database Management System", IBM Technical Disclosure Bulletin, Voo. 38, No. 2, Feb. 1995, pp. 143-145.

IBM Corp., "Recovery Protocol for Nested Transactions Using Write-Ahead Logging", IBM Technical Disclosure Bulletin, vol. 31, No. 4, Sep. 1988, pp. 451-452.

IBM Corp., "Network File System Users Guide", 3rd Edition, Dec. 2001, Chapters 1 & 5, pp. 1-8 & 37-38.

Magnussen, et al., "Queue Locks on Cache Coherent Multiprocessors, "IEEE 1993 doc. ID XP 010098628, pp. 165-171.

Mellor-Crummy, et al., "Algorithms for Scalable Synchronization . . . ", AMC Transactions on Computer Systems, Feb. 9, 1991, No. 1. New York, pp. 21-28.

Mohan, Aries: A Transaction Recovery Method Supporting Fine-Granularity Locking and Partial Rollbacks Using Write-Ahead Logging, ACM Transactions on Database Systems, vol. 17, No. Mar. 1992, pp. 94-162.

Moss et al., "Nested Transactions: An Approach to Reliable Distributed Computing", Laboratory for Computer Science, Massachusetts Institute of Technology, Apr. 1981, pp. 1-178.

EPO Communication dated Jun. 18, 2007 for Application No. 04 731 051.1-1243.

PCT/GB2004/001899, PCT Invitation to Pay Additional Fees, dated Sep. 27, 2004.

PCT/GB2004/001899, PCT Search Report and Written Opinion, dated Dec. 29, 2004.

PCT/GB/2004/001927 PCT Search Report and Written Opinion, mailed Jan. 31, 2005.

PCT/GB2004/001927, Partial International Search, mailed Sep. 27, 2004.

Rabbat, et al., "A High-Availability Clustering Architecture with Data Integrity Guarantees", Proceedings of the 2001 IEEE International Conference on Cluster Computing, 2002.

Radovic, et al., Efficient Synchronization for Nonuniform Communication Architectures, IEEE 2002, Doc. ID XP002308574, pp. 1-13.

Ray et al., "An Advanced Commit Protocol for MLS Distributed Database Systems", 1996 ACM, pp. 119-128.

Rothermel, et al., "ARIES/NT: A Recovery method Based on Write-Ahead Logging for Nested Transactions", Proceedings of the 15th International Conference on Very Large Data Bases, Amrsterdam, 1989; pp. 337-346.

The Santa Cruz Operation, Inc., "The Locking Protocol", The NFS Network Lock Manager, [online], 1999, [retrieved on Aug. 2, 2002]. Retrieved from the Internet at URL:// http://docsrv.caldera.com/NET_nfs/nfsC.lock_prot. html>.

The Santa Cruz Operation, Inc., "File Locking and System Crashes", The NFS Network Lock Manager [online], 1999, [retrieved on Aug. 2, 2002]. Retrieved from the Internet at <URL:http:// docsrv.caldera.com/NET_nfs/nfsC.locking_crashes.html>.

The Santa Cruz Operation, Inc., "The Network Status Monitor", The NFS Network Lock Manager [online], 1999, [retrieved on Aug. 2, 2002]. Retrieved from the Internet at < URL : http:// docsry.caldera.com/NET_nfs/nfsC.sat_mon.html>.

Scott, et al., "Non-Blocking Timeout in Scalable Queue-Based Spin Locks", PODC 2002, Jul. 21-24, 2002, pp. 31-40.

Scott, et al., Scalable Queue-Based Spin Locks with Timeout, PPOPP '01, Jun. 18-20, 2001, 9 pp.

Shin et al., "An Efficient Log-Based Crash Recovery Scheme for Nested Transactions", Microprocessing and Micropramming, vol. 31, Issue 1-5, Apr. 1991, pp. 99-104.

Zhang, et al., "Scaling Internet Services by Linux Director", Proceedings of the Fourth International Conference/ Exhibition on High Performance Computing in the Asia-Pacific Region. 2000. vol. 1, pp. 176-183.
Non-U.S Search Report for for Taiwan Invention Patent Application No. 093112119, dated Mar. 17, 2009, 1 pg.
Non-U.S Search Report for for Taiwan Invention Patent Application, dated Apr. 2, 2009, 1 pg.
Patent Abstract for TW513512, published on Dec. 11, 2002, 1 pg.
Patent Abstract for TW522303, published on Mar. 1, 2003, 1 pg.
Abstract and Machine Translation for JP08137707, published on May 31, 1996, 20 pg.
Canadian Office Action, dated Feb. 3, 2010, for Application No. 2,677,251, 2 pgs.
Abstract and Machine Translation for JP10021098, published on Jan. 23, 1998, 13 pgs.
R. Kataoka et al. "Priority Management for Mixed Processing of Real-Time and On-Line Transactions", Transactions of the Instituted of Electronics, Information and Commission Engineers, vol. 176 D-I, No. 5, May 25, 1993, total 12 pgs. (English Abstract Included).
Japanese Information Disclosure Statement, dated Mar. 26, 2010, 1 pg.
First Office Action for U.S. Appl. No. 10/428,780, dated Apr. 19, 2006, 21 pgs.
Response to First Office Action for U.S. Appl. No. 10/428,780, dated Jul. 19, 2006, 18 pgs.
Final Office Action for U.S. Appl. No. 10/428,780, dated Oct. 23, 2006, 27 pgs.
Response to Final Office Action for U.S. Appl. No. 10/428,780, dated Dec. 21, 2006, 20pgs.
Advisory Action for U.S. Appl. No. 10/428,780, dated Jan. 9, 2007, 5 pgs.
Supplemental Response for U.S. Appl. No. 10/428,780, dated Jan. 23, 2007, 22 pgs.
Notice of Allowance for U.S. Appl. No. 10/428,780, dated Apr. 18, 2007, 19 pgs.
Notice of Allowance for U.S. Appl. No. 10/428,780, dated Aug. 21, 2007, 16 pgs.
First Office Action for U.S. Appl. No. 11/777,911, dated Jun. 24, 2009, 26 pgs.
Response to First Office Action for U.S. Appl. No. 11/777,911, dated Sep. 24, 2009, 19 pgs.
Final Office Action for U.S. Appl. No. 11/777,911, dated Jan. 6, 2010, 13 pgs.
Response to Final Office Action for U.S. Appl. No. 11/777,911, dated Apr. 6, 2010, 8 pgs.
Notice of Allowance for U.S. Appl. No. 11/777,911, dated Apr. 23, 2010, 8 pgs.
Second Notice of Allowance for U.S. Appl. No. 11/777,911, dated Sep. 9, 2010, 9 pgs.
Notice of Appeal and Pre-Appeal Brief Request for Review for U.S. Appl. No. 11/777,911, dated Apr. 6, 2010, 6 pgs.
Amendment for U.S. Appl. No. 11/777,911, dated Apr. 6, 2010, 8 pgs.

LOCK AND TRANSACTION MANAGEMENT

CROSS-REFERENCE TO RELATED APPLICATIONS

This application is a divisional of and claims the benefit of U.S. Pat. No. 7,870,111 having U.S. patent application Ser. No. 11/777,911, filed on Jul. 13, 2007, which is a divisional of U.S. Pat. No. 7,289,992, having U.S. patent application Ser. No. 10/428,780, filed on May 1, 2003, the disclosure of each of which is incorporated herein by reference in its entirety.

This application is related to commonly assigned and co-pending:

U.S. Pat. No. 7,496,574, with U.S. patent application Ser. No. 10/428,758 entitled "Method, System, and Article of Manufacture for Managing Locks and Transactions," by Michael L. Walker, filed on May 1, 2003;

U.S. patent application Ser. No. 10/266,458 entitled "Method, System, and Program for Managing Locks Enabling Access to a Shared Resource", by Chetan Ahuja et al., filed Oct. 8, 2002;

U.S. Pat. No. 7,844,585, with U.S. patent application Ser. No. 11/840,842 entitled "Method, System, and Program for Managing Locks and Transactions," by Michael L. Walker, filed on Aug. 17, 2007, which is a continuation of and claims the benefit of application Ser. No. 10/428,758 filed on May 1, 2003; and U.S. patent application Ser. No. 12/147,388 filed on Jun. 26, 2008, filed on Aug. 17, 2007, which is a continuation of and claims the benefit of application Ser. No. 10/428,758 filed on May 1, 2003;

each of which is incorporated by reference herein in its entirety.

BACKGROUND OF THE INVENTION

1. Field of the Invention

The present invention relates to lock and transaction management.

2. Description of the Related Art

Oftentimes, resources (e.g., memory, disk drives, fiber optic channels, etc.) are shared among several applications. For example, several client computers, each running client applications, may access the same server computer with a set of resources. In certain cases, an application may want to access a resource without allowing any other applications to access the resource simultaneously. For example, if a first application wants to update data in a database, the first application may want access to the database to perform the update without other applications potentially attempting to update the same portion of the database.

To ensure serial access to resources, oftentimes locks are used. An application obtains a lock on a resource in order to obtain access to the resource. For example, if a first application obtained a lock on a first resource, a second application would not be able to access the first resource until the lock on the first resource was released by the first application.

In some cases, a request from a client application at a client computer may be sent to a first agent at a server computer. The first agent may pass the request to a second agent, which again may pass the request to a third agent. The first agent is acting as a client to the second agent, and the second agent is acting as a client to the third agent. The third agent may process the request (e.g., retrieve data) and return a result to the second agent, which returns the result to the first agent. The first agent then returns the result to the client application. Although three agents were used in this example, two or more agents working together to pass requests and return results may be referred to as cascading agents.

In some cases, each agent in the set of cascading agents obtains a lock on a resource. However, there is no link indicating the client application for which an agent obtained the lock. Thus, it is possible that a first agent obtains a lock on a resource for a client application. Then, when a second agent receives the request from the first agent and attempts to obtain a lock on the resource, the second agent is denied the lock. Since both the first and second agents are processing the same request for the client application, both should be able to lock the resource. Thus, some conventional systems do not support locking for cascading agents.

Multiple locks may be required to process a request. Some conventional systems require a client application to obtain all locks required to process a request. For example, if a first application requires access to a first and second resource, some systems require that the first application obtain locks for both resources before any processing. If the first application obtains a lock on the first resource, but a second application obtains a lock on the second resource, the first resource waits for the lock on the second resource.

Some systems require client applications to manage locks. The rules for locking may be onerous, which leads to increased complexity in the client applications.

Furthermore, some database management systems include transaction managers.

These transaction managers log results of actions, without logging the actions.

There is a need in the art for an improved locking and transaction management system.

SUMMARY OF THE INVENTION

Provided are a method, system, and program for transaction management. An indication is received that a transaction is beginning. An operation identifier for the transaction is generated. Actions are logged for the transaction identified by the operation identifier, wherein the actions include requests, corresponding reverse requests, and locks granted.

Additional implementations provide a method, system, and program for locking management. A command is received that specifies an operation identifier. It is determined whether the command is associated with a transaction using the operation identifier. If it is determined that the command is associated with a transaction, operating at a transaction level of locking Further implementations provide a method, system, and program for lock management. Under control of a lock manager, (i) lock request queuing is performed, (ii) heartbeat functions are performed, and (iii) state information is maintained.

The described implementations of the invention provide a method, system, and program for a lock and transaction management system.

BRIEF DESCRIPTION OF THE DRAWINGS

Referring now to the drawings in which like reference numbers represent corresponding parts throughout.

DETAILED DESCRIPTION

Figure 1:
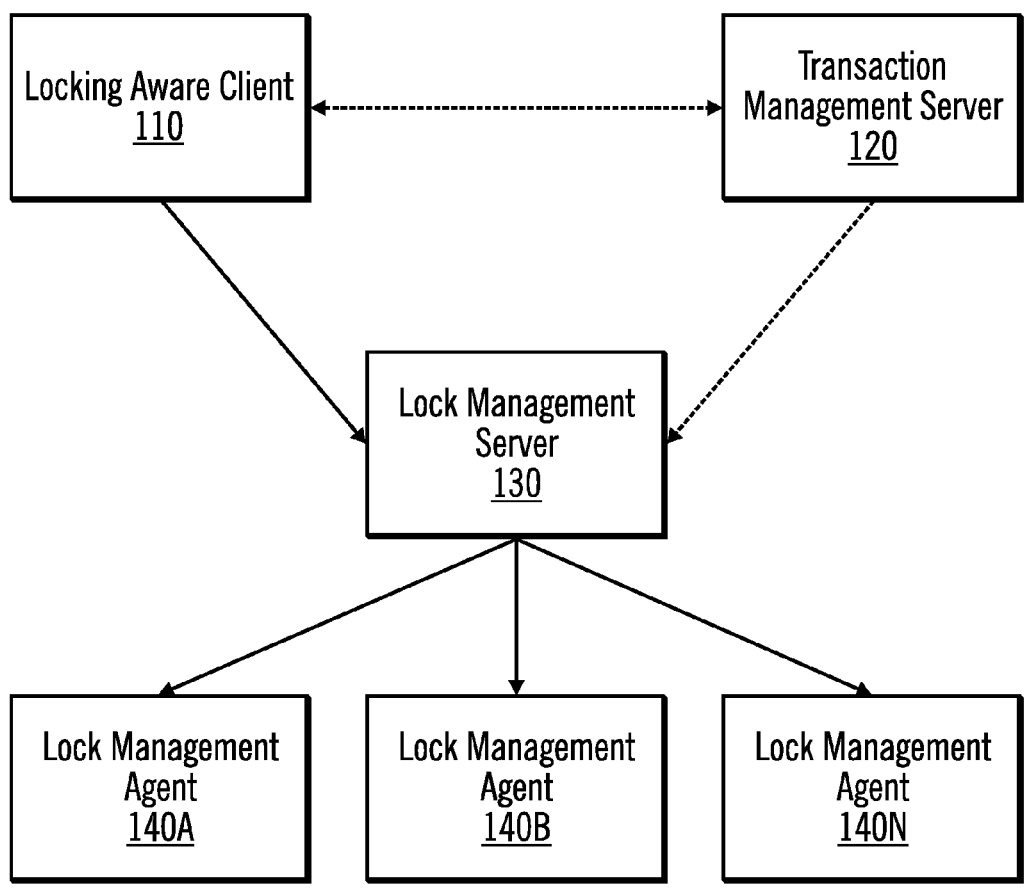
FIG. 1, illustrates, in a block diagram, a reference model for locking and transaction management that involves four different roles in accordance with certain implementations of the invention.

In the following description, reference is made to the accompanying drawings which form a part hereof and which illustrate several implementations of the present invention. It is understood that other implementations may be utilized and structural and operational changes may be made without departing from the scope of the present invention.

A lock and transaction management (LTM) system is provided. The LTM system identifies the locking considerations and requirements for supporting "virtualization" and "virtual storage services." The term "virtualization" refers to pooling physical storage devices from multiple network storage devices into what appears to be a single storage device that is centrally managed from, for example, a single server computer. In certain implementations, virtualization is used as part of a storage area network (SAN). A storage area network (SAN) is a high-speed network or subnetwork that interconnects shared data storage devices with associated server computers that are accessed by client computers. The term "virtual storage device" refers to a storage device that has been pooled. The term "virtual storage services" refers to services provided by the pooled storage devices (e.g., locking) In addition to specifying lock management protocols, the LTM system supports a lock manager. Furthermore, the LTM system supports a transaction manager and defines the locking required to support transaction management.

In certain implementations, a lock manager is a "lock management server" that provides locking functions for locking aware clients and locking aware agents, and follows the rules for lock managers.

In certain implementations, a transaction manager is a "transaction management server" that manages and controls execution of a transaction and initiation of commit or rollback processing. A transaction is an operation that has "ACID" properties. That is, a transaction is Atomic, produces Consistent results, is Isolated and is Durable. In short, a transaction is an operation that either "all completes" or "all fails," and this is guaranteed across system or component failures. An operation is a sequence of agent requests (or "actions") from a single client. This may also be referred to as a "client operation." In the presence of a transaction manager, an operation is a transaction. Commit refers to a transaction function for ensuring that the actions of a transaction are all executed. Rollback refers to a transaction function that involves "undoing" the actions of a transaction. A transaction manager maintains a transaction log, which is a non-volatile record of transaction information.

The philosophy behind the LTM system locking is to define transaction related locking and then to define locking without transaction support. Based on the transaction design, the expectation is that locking without transaction support scales back the design to accommodate less rigorous designs. The intent is to ensure that the scaled back implementation of locking without transaction support is a subset of the transaction related locking design and that the scaled back locking without transaction support design can, in fact, extend to transaction processing.

The LTM system locking attempts to place intelligence in lock management servers rather than in clients or agents. The rationale for this is based on the premise that it will be easier to get the function right (or at least consistent) if the intelligence is localized, rather than distributed across multiple vendor clients and agents.

1.0 Introduction

The purpose of the lock management protocols is to support multiple, non-cooperating clients operating against a distributed network of agents. Non-cooperating clients are multiple clients that are independent of each other, compete for resources, and execute independent of each other. Locking is used to manage potentially conflicting operations from clients from multiple vendors in a heterogeneous storage area network. Clients that participate in the locking mechanism will be assured their operations are not conflicting with other operations that may be going on in the storage area network.

Lock management in the LTM system is designed to support multiple "levels of support." The most robust level is the "transaction" level of locking Support for the transaction level of locking support requires that there be a "transaction manager." The next level of support is called the "isolation" level of locking and does not require the presence of a transaction manager. The last level of support is called the "client controlled" level of locking. Each of these levels can be characterized by the ACID (Atomicity, Consistency, Integrity and Durability) support they guarantee. The support provided is summarized in the following Table 1:

TABLE 1

| Level of Locking | Atomicity | Consistency | Isolation | Durability |
|---|---|---|---|---|
| Transaction | Yes | Yes | Yes | Yes |
| Isolation | No | No | Yes | No |
| Client Controlled | No | No | No | No |

1.1 Atomicity

Atomicity refers to an "operation" being completely done or not done at all (where an operation is defined as multiple requests to one or more agents). Support for atomicity requires "rollback" capability for undoing "operation" requests when the operation fails. For this reason, atomicity is supported in the "transaction" level of locking, and a transaction manager supports/drives the rollback process.

The "isolation" and "client controlled" levels of locking do not support or require atomicity support. As a result, these levels can operate in the absence of a transaction manager.

1.2 Consistency

Consistency refers to leaving "model" data in a consistent state. Consistency is supported in the transaction level of locking Consistency is not necessarily supported in either the isolation or client controlled levels. In certain implementations, agents are expected to ensure their model is self-consistent. However, there is no way to guarantee that an agent's model is consistent with those of other agents.

Since rollback is not supported in the isolation or client controlled levels, the "cross agent" model is not necessarily left in a consistent state. For example, if a client changes zones (e.g., a fabric request) and reassigns volumes (e.g., an array request) in the new zones, this can be left "half done" in the event of a failure. In the isolation and client controlled levels of locking, consistency at the SAN model level is left up to the client.

1.3 Isolation

In the context of lock management, the LTM system defines an operation as a sequence of related agent actions (or requests) initiated on behalf of a single client. An action is a single request to an agent from a single client. A client operation is typically composed of multiple actions (or requests) on various agents. With isolation, "operations" appear as though they are executing serially with other operations. Even though the LTM system operations execute concurrently, it appears to each operation, "O", that the other operations executed either before operation "O" or after operation "O", but not both. This simply means that a LTM system operation executing concurrently with other LTM system operations or Common Information Model (CIM) operations under the lock management of the LTM system behaves as if it were the only operation executing. CIM is a standard for creating object models for managing information. An object model is an object-oriented representation of a network resource, such as a storage area network. The CIM standard is provided by the Distributed Management TaskForce (DMTF), Inc. For further information on the CIM standard, see "Specification for CIM Operations over HTTP," Version 1.1, May 2, 2002, hereinafter referred to as "CIM specification," which is incorporated by reference herein in its entirety.

Isolation requires that locks block actions from modifying information used by the operation. Isolation is supported with both the transaction and isolation levels of locking Isolation can be effected by client logic when the "client controlled" level of locking is used, but the locking mechanism itself does not guarantee isolation.

In support of isolation, the locking design supports the notion of a "Read" lock as something distinct from a Change lock. A Read lock allows a client to hold a resource that the client has no definite intention of changing, but does not want the value to change while the client's operation is in progress. For example a client might scan multiple storage pools looking for available space to create a volume, and the client will create the volume from one of the storage pools. Rather than obtain a Change lock on all of the storage pools, the client can obtain a Read lock on all of the storage pools and issue a Change lock for the one storage pool the client selects.

While locking supports "read" locks to support isolation, the locking design also supports "dirty reads" (reads are allowed even if Read locks are not obtained) for cases where a client will not re-read or rely on the information. A dirty read is any client request that retrieves information from an agent without acquiring a lock (i.e., read or change). This is called a dirty read because the read is not protected. A subsequent read of the same information could yield different results.

1.4 Durability

With durability, when success is returned, the results actually happen. The significance of the "durability" varies depending on the level of locking used. In the context of the transaction level of locking, durability means that when the client operation completes (successful or not), the results are guaranteed across failures. This implies logging and a 2-phased commit process to ensure that all agents have committed (or rolled back). In a 2 phased commit process, a first process indicates to other processes that it is preparing to commit. Each of the other processes prepares to commit. Then, the first process commits, and the other processes commit. The logging assures that on restart, the transaction manager can determine what was supposed to happen and make sure it does.

Durability in the context of the "isolation" or "client controlled" levels of locking, guarantees that when a client gets a successful return, the request has been satisfied. This includes lock requests, as well as actions on agent models. Those requests that have not been responded to cannot be assumed to have been done (although they may have completed). In essence, the client application can assume the operation completed to the point of the last positive response.

2.0 Lock/Transaction Management Constituents

In the discussion of lock management and transaction management there are a number of constituents that participate in the process. The constituents are summarized here for ease of reference.

An element manager is a management tool for managing a specific device in the SAN environment. In the context of the locking design, the element manager is assumed to be locking unaware and not a CIM client. If an element manager is coded as a CIM client, then it is covered under the rules that govern locking aware clients.

A lock manager is also referred to as a "lock management server" and provides locking functions for locking aware clients and locking aware agents, and follows the rules for lock managers.

A locking aware agent is an agent or object manager that supports locking requests for agents and supports the locking rules for agents.

A locking aware client is a client that does locking of resources and follows client rules for locking A locking unaware agent is an agent or CIM object manager that does not support the locking requests.

A locking unaware client is a client that does not do locking at all.

A transaction manager is a server that manages and controls execution of the transaction (and initiation of commit or rollback processing).

For scalability reasons, the lock manager and transaction manager design accommodates multiple instances of each of these constituents (including multiple lock managers and multiple transaction managers).

3.0 Design Principles

There is a set of design principles that the locking is designed to support. Not all of the design principles apply to all levels. The design principles and the locking levels they apply to are summarized in the following Table 2:

TABLE 2

| Design Principle | Transaction | Isolation | Client Control |
|---|---|---|---|
| Protect operations across multiple agents from multiple simultaneous non-cooperating clients. | YES | YES | YES |
| The ability for the locking mechanism to cope with clients or other management tools that do not do locking. | YES | YES | YES |
| Provide for finer grain locking than whole agents. | YES | YES | YES |
| Define a locking architecture that is extendable. | YES | YES | YES |
| Define a locking architecture that can be standardized through the SNIA and DMTF. | YES | YES | YES |
| Provide support for cascading agents. | YES | YES | YES |
| Lock as you go support. | YES | YES | YES |
| Scalable design. | YES | YES | YES |
| Support for Client chosen Level of Locking. | YES | YES | YES |
| Low reliance on Client "intelligence," in favor of putting the intelligence in the lock managers or Agents. | YES | YES | NO |
| Design for extension to Transaction Management. | N/A | YES | YES |
| Provide for a simple locking mechanism with deadlock handling and error situations. | NO | NO | YES |

TABLE 2-continued

| Design Principle | Transaction | Isolation | Client Control |
|---|---|---|---|
| "Unlock as you go" support. | NO | NO | YES |
| Provide a locking mechanism that can support all ACID properties, including atomicity. | YES | NO | NO |
| Provide a locking mechanism that is resilient across failures | YES | NO | NO |

For protection of operations across multiple agents from multiple simultaneous non-cooperating clients, all locking mechanisms support coordinating access to management information in a SAN across non-cooperating clients. The level of locking required can vary depending on the capability desired by the client, but all levels of locking allow a client to protect client operations via locking The ability for the locking mechanism to cope with clients or other management tools that do not do locking is a concession to existing management tools that do not perform locking today. The locking mechanisms are able to deal with existing management tools in a way that protects the clients that are performing locking Providing for finer grain locking than whole agents allows clients to gain greater concurrency by allowing them to lock at a granularity less than the whole agent.

Defining a locking architecture that is extendable defines an architecture that allows extension to meet evolving needs of SAN management.

Defining a locking architecture that can be standardized through the Storage Networking Industry Association (SNIA) and Distributed Management TaskForce (DMTF) enables the locking architecture to be usable in the context of a CIM managed environment for the express purpose of making it usable as a potential extension to standards for CIM.

Providing support for cascading agents is another design principle. In terms of cascading agent support, virtualization involves cascading of elements (e.g., storage devices) in a storage area network (SAN). A cascading agent is a lock management agent that also serves as a lock management client to "lower level" agents. The LTM system allows virtualization systems to be able to perform actions on lower level agents as a result of client operations. An action is a single request to an agent from a single client. A client operation is typically composed of multiple "actions" on various agents. In particular, with the LTM system, a cascading agent determines whether or not actions on lower level agents are or are not in conflict with the originating client. In certain implementations, the cascading agent obtains locks on behalf of the client if the locks are required to complete the client request. If the action is triggered by the client request, but is not needed to complete the client request, the cascading agent may execute the action on its own behalf.

"Lock as you go" support allows clients to "lock as you go," meaning that locks do not have to be obtained by the client until the client decides to perform an action. This is to allow virtualization systems to invoke functions on lower level agents. "Lock as you go" support also gives clients more freedom to code logic (e.g., search for storage, when found, lock and move to next step).

Scalable design refers to the design principle that locking for all levels scale to enterprise SAN configurations. This means the locking design avoids "bottlenecks" in the architecture and the communications required to support the locking design do not overwhelm the network.

With support for client chosen level of locking, the client understands the nature of the client operation and what it is trying to achieve. The locking design supports the locking level chosen by the client.

Low reliance on client "intelligence," in favor of putting the intelligence in the lock managers or agents supports rules for clients that do not inhibit useful work. Rules for clients are not overly complex. The isolation and transaction levels of locking avoid relying heavily on well-behaved clients. Clients have few rules that they need to follow and actions taken by clients that violate proper behavior are enforced. A locking aware client that is using "isolation" or "transaction" levels of locking does not have to worry about whether it is doing locking correctly. The locking either works or the locking system will tell the client when the client has violated a locking protocol.

This low reliance on client "intelligence" characteristic of the locking has implications on the lock manager and lock management agents. The lock manager handles most of the rules and rules enforcement. This design principle, however, does not apply to the client controlled level of locking With design for extension to transaction management, the isolation level of locking (and to a certain extent, the client controlled level) are extendable to the transaction level of locking without requiring client redesign. That is, locking at the isolation level is able to pick up transaction capability should a transaction manager be present in the locking environment with minimal recoding of the client. In certain implementations, this design principle does not apply to the transaction level of locking Providing for a simple locking mechanism with deadlock handling and recovery from error situations is an design principle. A deadlock occurs when two or more clients attempt to lock two or more resources (e.g., objects) in a sequence that results in neither client being able to complete their operations because they are both waiting on each other. The purpose of the "client controlled" level of locking is to accommodate a relatively simple deployment of locking. This includes a mechanism to support deadlock handling and defined recovery states in error situations. In certain implementations, this design principle applies to the client controlled level of locking.

The "unlock as you go" support is a locking protocol that is intended to support a minimal locking environment. That is, locking that minimizes the locks held and the duration that locks are held. "Unlock as you go" means the client can tell the system when the client is ready to release resources that the client has acquired. In certain implementations, this sacrifices isolation properties and transaction processing, but it is a reasonable action based on client logic. So, the design allows non-transaction applications to "unlock as they go." In certain implementations, this design principle applies to the client controlled level of locking Providing a locking mechanism that can support all ACID properties means the locking mechanism supports the locking requirements implied by a transaction manager. In certain implementations, providing a locking mechanism that can support all ACID properties does not mean that the lock manager has to supply the transaction manager role or that the lock manager needs to support transaction locking in all cases (just in the transaction environments). In certain implementations, this design principle applies to the transaction level of locking Providing a locking mechanism that is resilient across failures is another design principle. To support transaction processing, the locking mechanism is able to recover in the event of failures. This can be done in conjunction with a transaction manager. If a failure occurs in the middle of a client operation, access to locked resources is blocked until appropriate recovery processes can be applied.

Once recovery has been ensured all locks are released in the event that any locks held by the client are lost. Several failure conditions are considered in the design, including failure of lock management servers, lock agents, lock clients and the communications among them. In certain implementations, this design principle applies to the transaction level of locking 4.0 Agent Assumptions There are some assumptions that the locking design makes relative to device support for management requests. These assumptions are inherent in the design of devices and the relationship between agent providers and devices they support. These assumptions are useful to understanding behavior of agent actions and are required in order for the locking mechanism to be effective.

In certain implementations, devices are designed to leave their meta-data in a consistent state. In certain implementations, a storage device does not allow actions that would leave metadata in an inconsistent state. For example, a disk array does not leave its state such that storage is lost (e.g., marked as used but not assigned to any volume). Similarly, a disk array does not leave its state such that storage is unintentionally mapped to two different volumes. This assumption also implies that the CIM agent for the device can ensure its data is consistent by keeping its model in sync with the metadata in the device.

In certain implementations, locking aware agents and devices imply locks on a request by request basis when dealing with locking unaware clients. Locking unaware clients are clients that do no locking at all. This implies locking awareness in the devices. That is, a locking aware agent obtains required locks (or equivalent, e.g., latch) to perform a client request, if a lock has not been obtained. However, the lock is released as soon as the client request is executed. This implies that the device is locking aware (not just the agent) to block "element manager" actions that conflict with locking clients.

5.0 Reference Model

FIG. 1, illustrates, in a block diagram, a reference model for locking and transaction management that involves four different roles in accordance with certain implementations of the invention.

The reference model includes a locking aware client 110. Locking unaware clients are discussed in detail below. The locking aware client 110 selects the level of locking that it desires. The locking aware client 110 does this by issuing, for example, a BeginTransaction request (which is described in further detail below) to a transaction manager if the locking aware client 110 wants transaction level of locking. The transaction manager manages the coordination of the commit or rollback of a transaction (i.e., client operation that is executing under transaction management control). In certain implementations, the transaction manager is described as an independent transaction management server 120. In certain implementations, the transaction manager may be co-resident on the same system as the client application. There typically is one transaction manager for each system that runs locking aware clients. The transaction manager maintains a log of actions (e.g., client requests) taken by the client application and the "reverse" actions required to perform a rollback of the transaction.

If the locking aware client 110 wants the isolation or client controlled level of locking, the locking aware client 110 omits the request to the transaction management server 120 and goes directly to a lock manager with, for example, a GetOperationId request, which is described in further detail below, to obtain an operation identifier ("operation id" or "OperationId") for the operation. In certain implementations, the lock manager is a lock management server 130 and coordinates the obtaining of locks from a set of lock management agents 140A . . . N that are in the same lock management group as the lock management server 130. In the figures, for ease of reference, multiple copies of elements in an illustration may be referred to with the same reference number and a character (e.g., 110A to 110N, wherein N indicates an nth copy of the element). For example, lock management agents 140A, 140B, and 140N will be referred to as lock management agents 140A . . . N.

A lock management group includes a lock management server and one or more agents. There may be one or more lock management servers 120, and so, one or more lock management groups, in the environment. Each lock management server 130 manages locking for a set of lock management agents 140A . . . N in the lock management group. An administrator can set up as many lock management servers 130 and lock management groups as needed to support scalability requirements. Lock management servers 130 may perform lock queuing if queuing is supported.

Lock management agents 140A . . . N perform locking for the device or devices managed by the lock management agent 140A . . . N. That is, the actual locks on resources are obtained and held at the agent level. In certain implementations, lock management agents 140A . . . 140N do not do queuing. Instead, the lock management agents 140A . . . 140N either grant or refuse locks, and the lock management server 130 manages queuing of lock requests. The lock management agents 140A . . . 140N hold locks until the lock management agents 140A . . . 140N are told to release them by a lock management server 130.

Each of these roles (locking aware client 110, transaction management server 120, lock management server 130, and lock management agent 140A . . . N) performs functions based on the level of locking (i.e., transaction, isolation, or client-controlled) requested by the client.

Figure 2A:
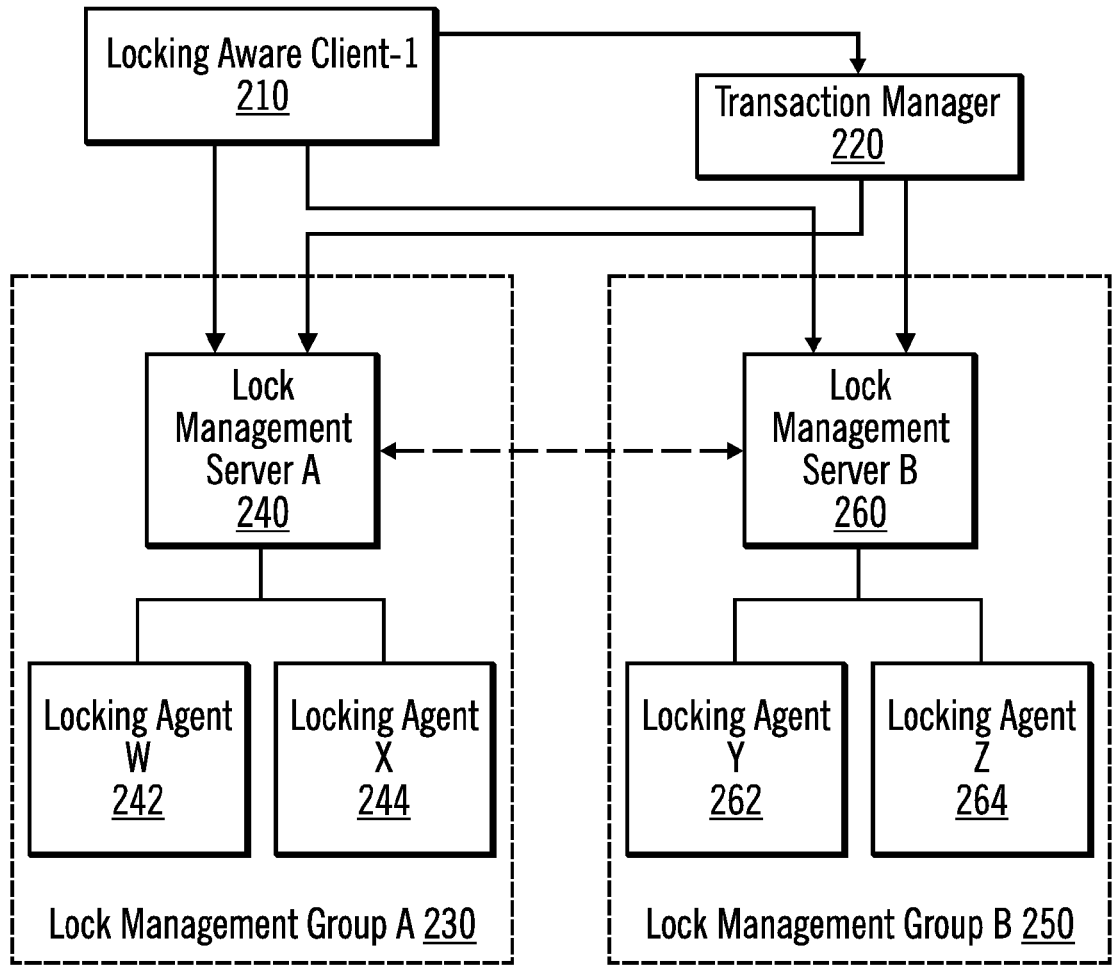
FIG. 2A illustrates a locking environment with a transaction manager in accordance with certain implementations of the invention.

The reference model for locking takes into account several locking environments, including the following: a locking environment with a transaction manager, which supports the transaction level of locking; a locking environment without a transaction manager, which includes both the isolation and client controlled level locking; and, support for locking unaware clients, which includes support given any of the levels of locking 5.1 Locking Reference Model with a Transaction Manager FIG. 2A illustrates a locking environment with a transaction manager 220 in accordance with certain implementations of the invention. A reference model for transaction locking includes one or more transaction managers in the environment, as well as lock management servers.

A locking aware client-1 210 is connected to transaction manager 220, lock management server A 240, and lock management server B 260. A lock management group A 230 includes the lock management server A 240, locking agent W 242, and locking agent X 244. A lock management group B 250 includes the lock management server B 260, locking agent Y 262, and locking agent Z 264. The locking agents W 242, X 244, Y 262, Z 264 are locking aware agents. In certain implementations, a CIM agent implements a locking agent W 242, X 244, Y 262, Z 264.

A transaction begins and ends as defined by a client application at a client. For ease of reference, actions performed by a client application will be said to be performed by the client. In FIG. 2A, a transaction begins when a client application at the locking aware client-1 210 sends, for example, a Begin-Transaction request to the transaction manager 220. The transaction manager 220 "creates" the transaction and returns an operation id to identify the transaction.

In certain implementations, the operation id is unique across lock management groups and transaction managers. Thus, the operation id may be a compound key with the first part being an indication of whether the operation id was generated by a transaction manager or not, the second part being the lock management group name or transaction manager name, and the last part being a unique number in the context of the lock management group or transaction manager. That is, the operation id takes the form T:A:number (where T is a boolean value, A is the name of the lock management group or transaction manager, and "number" is a unique integer).

Logging done by the transaction manager 220 and locks held will be in the context of the operation id. The first log entry for a transaction is the existence of the transaction (e.g., the begin transaction).

Once the locking aware client-1 210 has a transaction operation id, the locking aware client-1 210 locks resources that the locking aware client-1 210 intends to change. The locking aware client-1 210 also locks resources that the locking aware client-1 210 reads and that the locking aware client-1 210 wants to remain invariant during its operation. For a change operation (i.e., an operation that changes data) that the locking aware client-1 210 intends to issue, the locking aware client-1 210 passes a command to perform the change to the transaction manager 220 for logging and issues a lock request to a locking agent W 242, X 244, Y 262, Z 264 via the lock management server A 240, B 260. In addition to the change request, the locking aware client-1 210 also provides a "reverse" action to the transaction manager 220 in case the transaction manager 220 needs to perform a rollback of the operation.

The transaction manager 220 logs the change requests and the "reverse" actions for change requests that have reversible actions. In cases in which change requests do not have reversible actions, the actions are considered outside the scope of the transaction.

The end of a transaction is determined by one of three events: a Commit issued by the locking aware client-1 210 to the transaction manager 220; a Rollback issued by the locking aware client-1 210 to the transaction manager 220; or a failure condition of any of the constituents (e.g., the locking aware client-1 210 or transaction manager 220) in the transaction.

Failure of any of the constituents in the transaction before the transaction successfully completes will result in a rollback. In certain implementations, a heartbeat function is used to determine whether a constituent has failed.

In certain implementations, the transaction manager 220 may be a function that resides on the client system or the transaction manager 220 may be combined with lock management servers A 240 or B 260.

The locking design is extendable to support "server to server" communications for lock coordination, even though servers lock within their lock management group 230, 250. In certain implementations, the coordination supports lock management failover and coordinated deadlock detection. Deadlock detection refers to the act of discovering that a deadlock exists between two or more clients. However, with a lock queue timeout (i.e., a period of time during which a lock request may remain in a lock queue), the server to server communication is not required. With lock queuing, a lock is said to be queued if a lock request results in a lock conflict and an agent or lock manager queues the request until the conflicting lock is released. Lock queuing allows operations to complete, even if there are lock conflicts encountered during the operation. If the conflicting lock is never released, the situation is called a deadlock. A lock conflict is said to occur when a client requests a lock on a resource that is already locked (either explicitly or implicitly) by another client. Implicit locking refers to locks that are implicitly acquired as the result of an action performed by an agent.

5.2 Locking Reference Model without a Transaction Manager

Figure 2B:
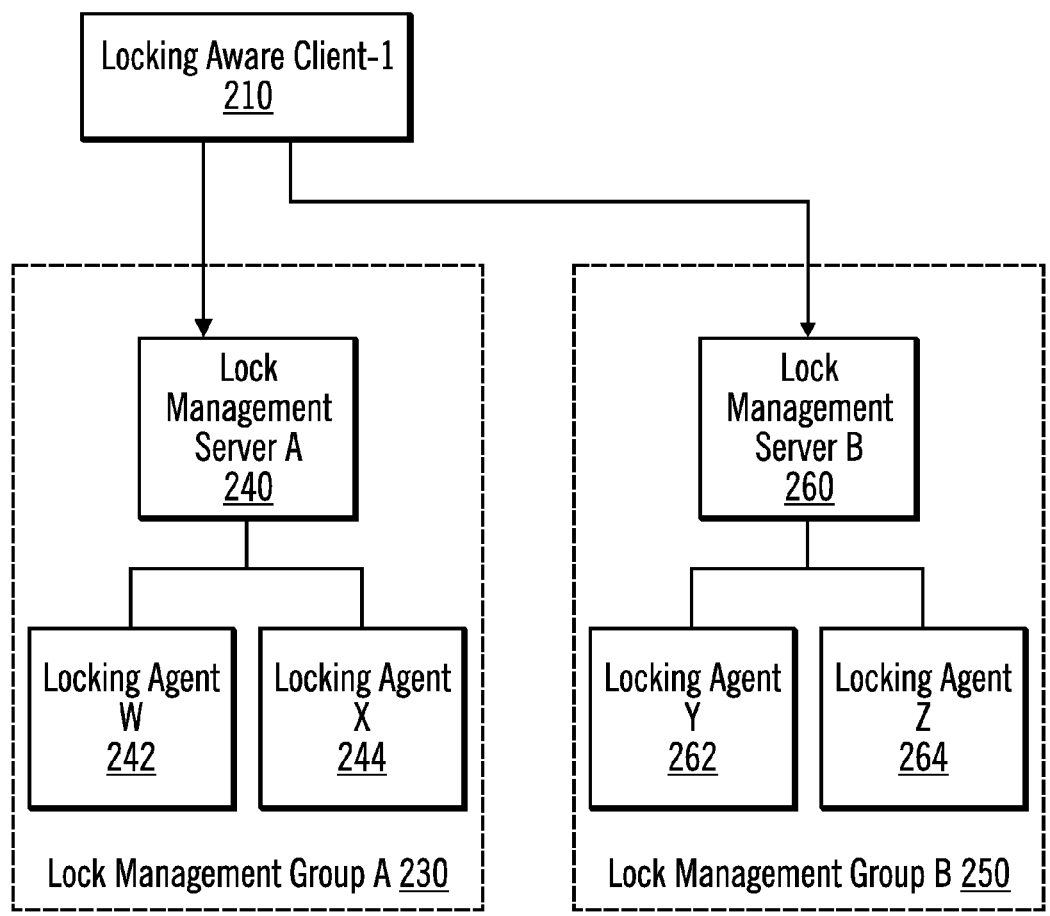
FIG. 2B illustrates a locking environment without a transaction manager in accordance with certain implementations of the invention.

FIG. 2B illustrates a locking environment without a transaction manager in accordance with certain implementations of the invention. The locking in an environment that does not have a transaction manager can be either at the "isolation" level or at the "client controlled" level.

In the locking environment illustrated in FIG. 2B, the locking aware client 210, lock management servers A 240, B 260, and locking agents W 242, X 244, Y 262, Z 264 are locking capable. The locking agents W 242, X 244, Y 262, Z 264 are assigned to lock management groups A 230, B 250, which are managed by lock management servers A 240, B 260, respectively.

In this locking environment, a client begins an operation by requesting an operation id from a lock management server A 240 or B 260 and declaring its intent to operate at the isolation level or the client controlled level (e.g., the locking aware client-1 210). A client that plans on using agents in lock management group A 230, B 250 could request the operation id from either lock management server A 240 or B 260. Assuming the locking aware client-1 210 requests the operation id from lock management server A 240, lock management server A 240 becomes the control server for the operation, but the operation id would be used when accessing lock management server B 260 as well. The operation id is obtained once for the operation.

For both the isolation and client controlled levels of locking, the locking aware client 210 locks the resource (e.g., object) the locking aware client 210 wants to use before the locking aware client 210 performs the action on the locking agent W 242, X 244, Y 262, Z 264. The locking aware client 210 issues the lock request to the appropriate lock management group's (A 230 or B 250) lock management server (A 240 or B 260) using the operation id the locking aware client 210 was assigned. The lock management servers A 240, B 250 receive lock requests, pass them on to locking agents W 242, X 244, Y 262, Z 264 and record them as held by the operation id. Locking agents W 242, X 244, Y 262, Z 264. either grant the locks or reject the locks. Queuing, if required, is done in the lock management server A 240, B 260. In certain implementations, if a locking agent W 242, X 244, Y 262, Z 264 rejects a lock, the locking agent W 242, X 244, Y 262, Z 264 passes back a "time on queue" value, which determines how long the locking agent W 242, X 244, Y 262, Z 264 will allow lock requests to stay on the queue.

If the queued request gets to the top of the queue, the lock request is re-issued to the locking agent W 242, X 244, Y 262, Z 264 to acquire the lock, and, if the lock is acquired, the locking aware client-1 210 is notified that the lock request has been granted.

If the queued request "times out" before getting to the top of the queue, the locking aware client-1 210 is notified that the lock request has been rejected. Since lock management servers A 240, B 260 are not transaction managers, in certain implementations, the lock management servers A 240, B 260 do not unilaterally release locks. In particular, the locks may be needed for locking aware client-1 210 actions to affect any "rollback" or operation recovery processing.

The locking design is extendable to support "server to server" communications for lock coordination, even though lock management servers A 240, B 260 lock within their lock management group A 230, B 250. In certain implementations, the lock coordination supports lock management failover and coordinated deadlock detection. However, with the lock queue timeout, server to server communication is not required.

5.3 Locking Unaware Client Support

Figure 2C:
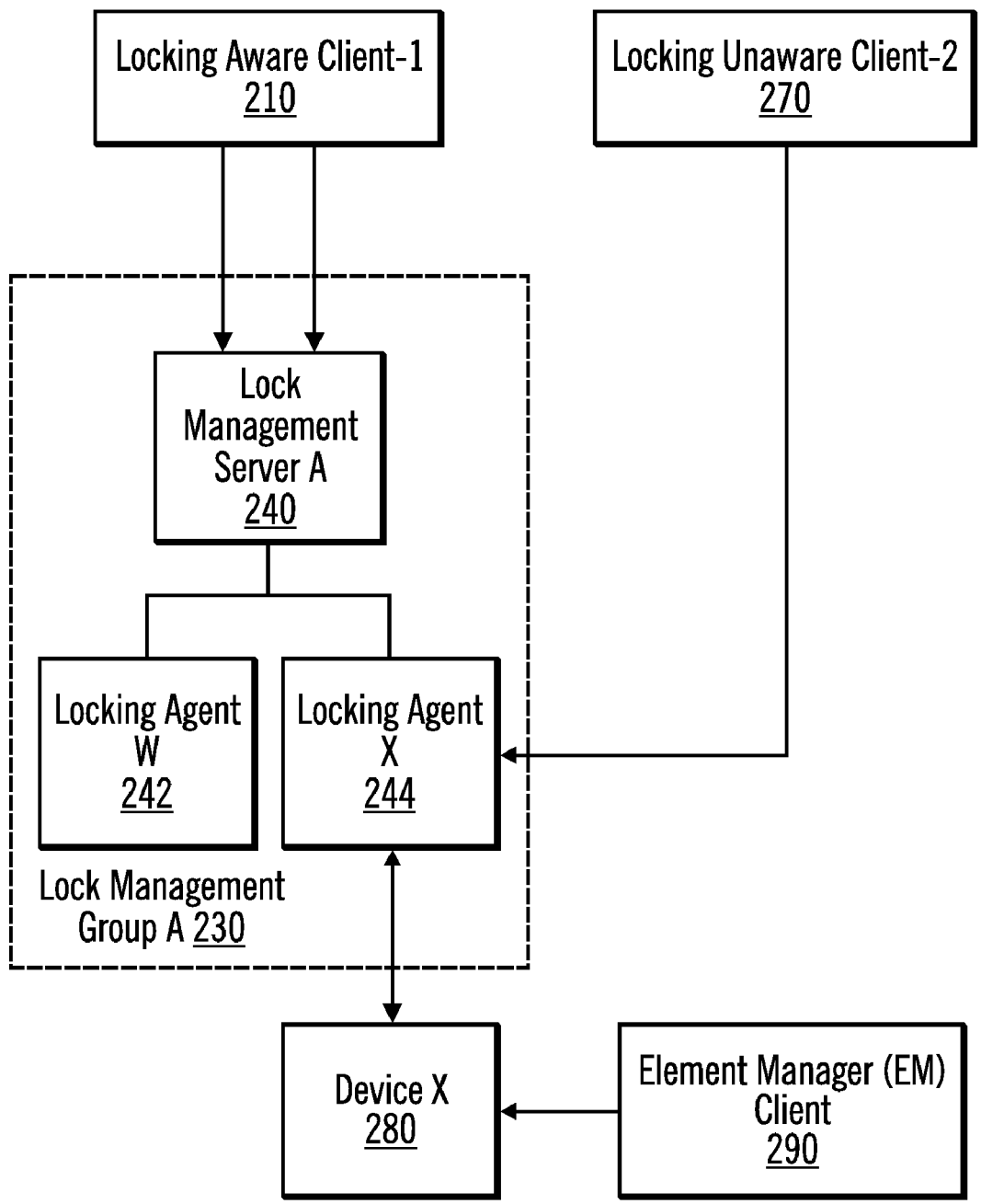
FIG. 2C illustrates a locking environment with a locking unaware client in accordance with certain implementations of the invention.

FIG. 2C illustrates a locking environment with a locking unaware client-2 270 in accordance with certain implementations of the invention. In particular, FIG. 2 shows a locking environment for "isolation" or "client controlled" levels. In FIG. 2C, locking agent X 244 is connected to device X 280, which is also connected to element manager client 290. An element manager client is a special type of locking unaware client. The considerations for "transaction" level locking are the same, so a transaction manager is not shown in the illustration of FIG. 2C.

In certain implementations, the locking unaware client-2 270 is a locking unaware CIM client. In certain implementations, locking unaware clients that are locking unaware CIM clients go through CIM agents (including locking aware agents). The locking unaware client 270 makes management requests of the locking agent W 242, X 244 without requesting a lock. In such cases, the locking agent W 242, X 244 attempts to obtain a "temporary lock" (or "latch") for the duration of the request if the action requested involves changes to the object model represented with CIM. In particular, if an object is reached via a CIM object path, the object is locked prior to access.

A latch is a temporary "lock" that is acquired by an agent in the process of servicing a single request. In certain implementations, latches are released no later than the completion of the request, and latches are not externally architected (i.e., latches are not referenced in any CIM interface, unlike locks). Latches may, however, be used by agents to temporarily hold a resource while performing an action. If the client request was a read action, no lock is required (e.g., the request is treated as a no lock read). Update requests could be blocked (due to locks held by locking aware clients). However, read actions are not blocked.

A special case to consider is that of an element manager 290. Under the assumption that many element managers will not be rewritten, it is particularly important to understand how the element managers interact with locking aware clients. Element managers are prepared to execute "outside" of a locking aware environment. While it might be desirable for element managers to be coded to exploit lock management when it is present, it is not required.

When a locking unaware element manager client 290 accesses a device X 280, the locking unaware element manager client 290 may do so without going through any CIM agent structure. Thus, the locking unaware element manager client 290 becomes the responsibility of the device X 280 to actually police the interaction between the element manager client 280 and locking aware client-1 210. The device X 280 follows these rules: (1) read actions issued by an element manager client 290 may be treated as "no lock" (dirty) reads and (2) obtain a "latch" for the resources covered by an element manager client's 290 action that will block lock actions from locking aware client-1 210. Element manager client 290 write actions that would conflict with locks held by locking aware client-1 210 are rejected. In effect, writes from the element manager client 290 imply a Change lock for the duration of the write action.

6.0 Lockable Resources

A lock reserves a resource (or resources) that will be the subject of a client (i.e., client application) request. For example, if a client wishes to modify a volume, the client locks the volume. An important part of the locking design is understanding the functions (i.e., requests) that are the basis for interoperation and what needs to be locked to assure that resources are reserved to allow execution of the request. Another related question is what gets locked if the client request is going to be a "create." That is, the question is how does a client lock something that does not yet exist. In the case of creating a volume, it might be reasonable for the client to lock the storage pool from which the volume is created. But this still leaves open the question of whether or not the volume created is locked. Finally, there is the question of how locks are identified. A scheme is required to uniquely denote a locked resource. Each of these topics is covered in the following sections.

6.1 Granularity of Locking

The locking design allows for granularity of locking. However, the locking does not require that every element of an object model be explicitly locked. Clients are to lock all resources that are directly impacted by the request they intend on issuing. For example, creating a volume will require a lock on the storage pool from which the volume is created. Performing a Logical Unit Number (LUN) mapping and masking request will require that the volumes, ports and host initiators to be referenced be locked. This is the client view of locking In addition to the client view, there is the agent view. From an agent's point of view, the purpose of locking is to reserve resources that allow a client to execute a request. Therefore, the agent locks enough resources to ensure that the client request will not be rejected due to a lock conflict. In certain implementations, agents are to lock all resources that are necessary to support the client's request and maintain the integrity of the agent model, which implies cascading locking Whenever there is ambiguity over what needs to be locked, the agent may escalate the lock to a higher lock. Specifically, the agent may escalate to an "agent lock." Similarly, a client may request an "agent lock." An agent lock is affected by locking the computer system instance for the device managed.

The minimum support required of a locking aware agent is the "agent lock." That is, any lock request may be escalated to an agent lock.

6.2 Cascading Locks

Figure 3:
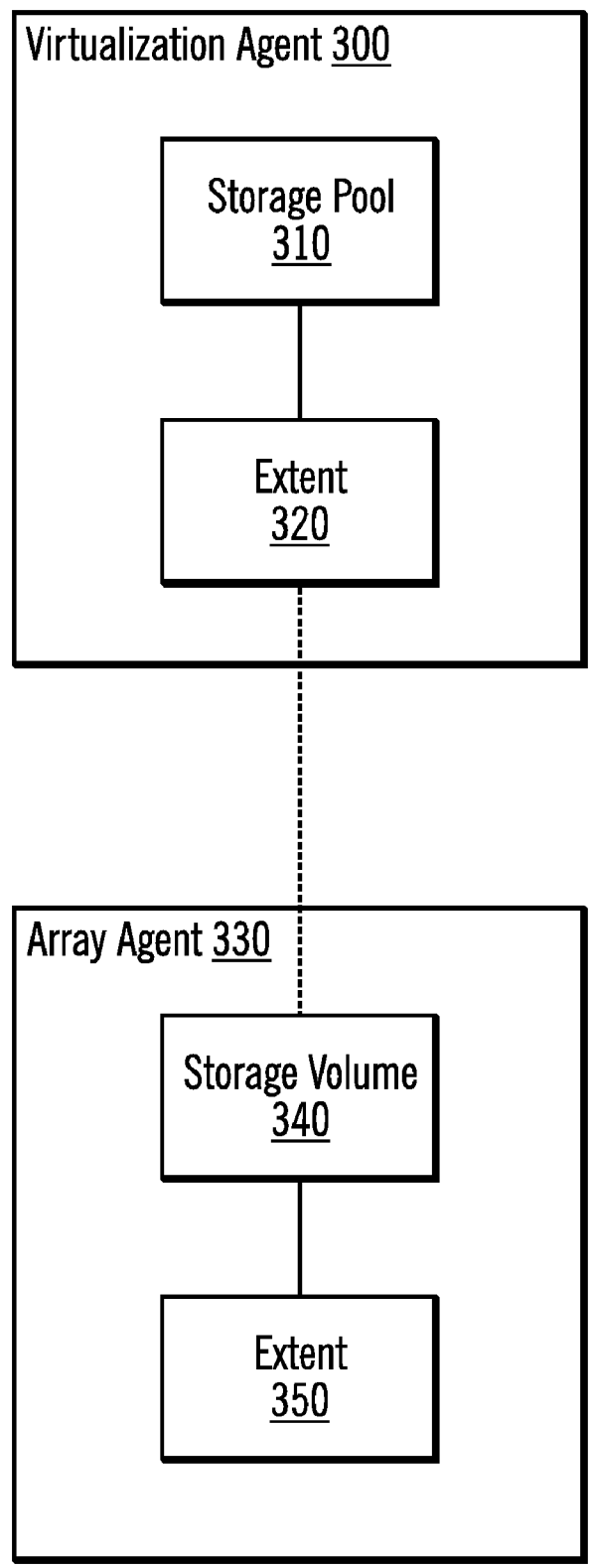
FIG. 3 illustrates cascading locking in accordance with certain implementation of the invention.

There is a cascading effect that agents need to consider in their locking implementations. The locking design defines this cascading effect such that locking of an object can effectively lock multiple objects (i.e., instances in a CIM environment) that the object is based on. FIG. 3 illustrates cascading locking in accordance with certain implementation of the invention. A virtualization agent 300 includes a storage pool 310 and extent 320. An array agent 330 includes a storage volume 340 and extent 350. Locking the storage pool 310 may imply a lock on the extent 320 that the storage pool 310 is based on. The lock on the storage pool 310 may imply locks issued to resources not managed by the virtualization agent 300 (e.g., resources managed by agents that cascade from the virtualization agent 300 agent that owns the storage pool 310). In order to maintain the integrity of the virtualization agent's 300 object model, the virtualization agent 300 may need to lock resources in lower level agents. For example, the virtualization agent 300 may lock the storage volume 340 and extent 350 owned by array agent 330.

In a CIM environment, profiles may be defined and each profile defines the lock cascading that is implied by the locks that the profile supports. The Storage Networking Industry Association (SNIA) is working to develop profiles for some object models. A profile describes a particular class of a storage area network (SAN) entity. A class of a SAN entity may describe a device within the SAN, such as a redundant array of independent disks (RAID) device. A RAID device enables storage of the same data on multiple hard disks, thus allowing simultaneous accesses to the copies of data.

6.3 Lock Identification

An instance lock is affected by referencing the CIMObjectPath for the instance. This is an opaque token obtained by the "Enumerate" instances, which is defined in Section 2.3.2.11 of the CIM specification and is used to enumerate instances of a CIM class. The actual lock instance is the combination of a client's operation id and the CIMObjectPath of the instance locked. In effect, a lock can be thought of as an association between an operation id and a CIMObjectPath. The association has the property of lock type (read or change).

6.4 Implied Locks

There are certain situations where locks are not explicitly requested, but are obtained. Specifically, when a resource (e.g., a storage volume or a storage pool) is created, the resource will not have a CIMObjectPath until the resource is created. As soon as the resource is created, a lock is obtained on the CIMObjectPath on behalf of the client operation id, without the client issuing a lock request.

Similarly, an agent may choose to lock more resources than requested by the client. In certain implementations, the agent does not assume the client has locked everything "below" the resource the client locked. For example, the agent knows what would be required to support a "delete instance" operation and may choose to lock all resources implied by the "worst case" request the client may make.

6.5 Lockable Resources and Levels of Locking

The resources that are locked are the same for all the levels of locking (i.e., transaction, isolation and client controlled). The granularity and how locks are identified are the same. Cascaded and implied locking can vary, but typically does not. In general, transaction locking will tend to require strict adherence to cascaded and implied locking to support potential rollback requests. The isolation and client controlled levels of locking do not require strict adherence, since they do not need to support rollback operations.

7.0 Lock Types

A lock type refers to the "strength" of the lock being requested. The lock type determines the actions that are blocked by the lock. In the context of LTM system locking, there are "change" locks and "read" locks. Change locks are stronger than Read locks.

The lock managers and lock agents in the locking design support both a Read Lock and Change lock are supported. The Read lock guarantees isolation (e.g., data read does not change during operation) without blocking other readers. The locking design also supports "no lock" (dirty) reads without implying a Read lock.

In certain implementations, a "no lock" write is not supported. That is, a write operation that occurs under an "OperationId" will cause a lock to be obtained (as in the "create" operations). A write operation that occurs without an "OperationId" implies the client is a locking unaware client and locking unaware client rules apply. That is, a Change lock (or latch) is acquired for the duration of the request.

Both Read and Change locks are supported in all three levels of locking (i.e., transaction, isolation and client controlled).

7.1 Lock Compatibility Semantics

Table 3 summarizes the lock compatibility semantics for LTM system locking in certain implementations.

TABLE 3

| Lock Requester | Lock Holder | | | |
| --- | --- | --- | --- | --- |
| | CHANGE | READ | NO LOCK READ | NO LOCK WRITE |
| CHANGE | DENY | DENY | GRANT | DENY |
| READ | DENY | GRANT | GRANT | DENY |
| NO LOCK READ | GRANT | GRANT | GRANT | GRANT |
| NO LOCK WRITE | DENY | DENY | GRANT | DENY |

Table 3 shows the interaction between two different clients. The first client is the "lock holder" on a resource A, and the second client is the "lock requester" for a lock on Resource A. If the lock holder has a Change lock, all lock requests are denied. However, a dirty read (no lock read) is not blocked as there is no lock request. If the lock holder has a Read lock on the resource, Change lock requests are denied and "no lock" writes are denied. The lock requester can obtain a Read lock or can do a no lock read. If the lock holder does not hold a lock (a no lock read), nothing is blocked. If a writer does not hold a lock, all requesters are blocked except the no lock reader.

7.2 Protected Actions

A protected action is one that may be blocked by a lock. The discussion of what is blocked by Read or Change locks provides basic principles, but the guidelines presented here are not an exhaustive list.

Web Based Enterprise Management (WBEM) is a set of management and Internet standard technologies developed by the Distributed Management TaskForce (DMTF), Inc. to unify the management of enterprise computing environments. The DMTF has developed a core set of standards that make up WBEM, which includes a Common Information Model (CIM).

CIM is a standard for an object-oriented model for managing information. The CIM standard is provided by the Distributed Management TaskForce (DMTF), Inc. For further information on the CIM standard, see "Specification for CIM Operations over HTTP," Version 1.1, May 2, 2002, hereinafter referred to as "CIM specification," which is incorporated by reference herein in its entirety.

Resources to be locked are identified by CIMObjectPaths. The implication is that anything that has an CIMObjectPath can be locked. However, the locking design proposed here gets a little more specific about what is meaningful to lock, and is based on cascading locking Generally, an Agent will support locking of a whole device (i.e., "locking the agent") or locking of individual instances of resources that are exported. If an agent does not support locking of a resource identified by a CIMObjectPath, the agent may escalate the lock to an agent lock.

There are also some guidelines for the interaction between locking unaware clients and locking aware clients.

Read Protected actions are those actions that are blocked by a Read lock. Read locks block Change locks, but not other Read locks. Read locks block Change locks on "cascaded objects" and objects that are lower in the lock hierarchy. For example, a Read lock on an agent implies a Read lock on all objects managed by the agent. A Read lock on a volume cascades to Read locks on any lower level object that could effect a change to the volume locked. Thus, locking a volume prevents changes to pools, extents or arrays the volume is based on by other agents.

Change (Write) Protected actions are those actions blocked by a Change lock. Change locks block other read or Change locks from other clients. Change locks block other locks on "cascaded objects." For example, a Change lock on an agent implies a Change lock on all objects managed by the object. A Change lock on a volume cascades to Change locks on any lower level object that could effect a change to the volume locked. Thus, locking a volume prevents reads or writes to pools, extents or arrays that the volume is based on.

Unprotected actions are those actions that are operating on objects that are not blocked by locks. Unprotected Read actions are those actions that are not blocked by a Read lock. A Read lock does not block other readers, but the Read lock does block writers (and Change locks). Unprotected Write actions are those actions that are not blocked by a Change lock. A Change lock does not block locks on other unrelated objects. The Change lock does not block dirty reads to the locked object. A dirty read is any client request that retrieves information from an agent without acquiring a lock (read or change). This is called a dirty read because the read is not protected. A subsequent read of the same information could yield different results. Also, a write action in the LTM system requires that locking aware agents imply a Change lock on each object being changed.

7.3 Interaction with Locking Unaware Clients

Interaction with locking unaware clients takes place when there is LTM system locking present, either the "lock holder" or the "lock requester" is locking, and the other client is not locking A locking unaware client does not issue any locks at all. However, when a locking unaware client attempts a write action, an implicit Change lock is acquired for the duration of the action. Thus, a Change or Read lock blocks any locking unaware client action on the locked resource. However, if the locking unaware client attempts a read action (a no lock read), the read action is not blocked by any locking. If a locking unaware client has updated a resource, this temporarily blocks a Change lock by a locking client. However, a dirty (no lock) read is not blocked.

8.0 Deadlock Management

The locking design deals with deadlocks by placing a deadlock detection mechanism in the lock manager. The locking supports the "lock as you go" semantics and supports lock queuing for cases where the lock is not immediately available. Deadlocks occur when two or more clients are attempting to lock two or more resources and are waiting on each other (this is sometimes referred to as a "deadly embrace"). In certain implementations, to resolve such situations, a lock manager can attempt to detect such cycles, pick one of the deadlocking clients and reject that client's lock request.

In certain implementations, the LTM system supports lock queue timeouts, which is a simpler approach. If a lock request stays on a lock queue for a predetermined amount of time without obtaining the lock, the lock request is denied. Each resource has an associated lock queue.

The length of time a lock may be queued is determined by the agent that would have granted the lock. Lock queues are held and maintained in the lock manager. Agents either grant or refuse locks. When a lock is refused by an agent, the agent may supply a "queue time" (the time the lock may remain queued before being rejected by the lock manager). If the agent does not supply a queue time, the lock manager will apply a default length of time (e.g., pre-defined or defined by the lock management administrator). A lock request may eventually get rejected. What happens next depends on the level of locking being employed.

For the transaction level of locking, the lock that times out on a queue will cause the operation (identified by operation id) to be aborted. Specifically, the lock manager that detects the timeout notifies the transaction manager that a lock request has been denied. The transaction manager will drive the rollback operation. The last part of the rollback is a release of the locks held by the transaction, which will free the deadly embrace (i.e., end the deadlock).

For the isolation level of locking, the lock manager will return a response to the originating client that the lock is being denied. The client may chose to re-issue the lock request, but the preferred action of the client would be to attempt to recover from what the client had done so far. For this reason, the lock manager does not automatically release locks on a lock refusal. The client is given a chance to attempt to "undo" work that the client had done to the point of the lock failure. When the client has completed its recovery actions, the client releases the locks.

For the client controlled level of locking, the lock manager will return a response to the originating client that the lock is being denied. As with the isolation level, the client in the client controlled case is given the chance to recover what it had done. However, in the client controlled case, this may mean re-acquiring locks the client had held before, but had released. This, of course, could result in a "cyclic denial" situation. For this reason, the lock manager will keep track of the number of denials that the lock manager has given to an operation id and unilaterally release all locks after a pre-determined number of denials (e.g., 3).

9.0 Lock Operations

A request/response protocol between locking aware clients and lock managers (servers) is illustrated in the following sections. Other messages may be added to the protocol or some messages may be removed or replaced without departing from the scope of the invention.

9.1 Lock Request/Response Parameters

An AgentRequest contains one of each of the following parameters: CIMObjectPath (i.e., an object path for each instance to be locked) and Type (i.e., the type of lock requested (Read or Change)). An AgentResults contains one of each of the following parameters CIMObjectPath (i.e., an object path for each instance that has been locked) and Type (i.e., the type of lock granted (Read or Change)).

An operation id is submitted on all lock requests. The operation id identifies the client operation that is requesting the lock. The operation id is established on the GetOperationId request or a Begin Transaction request.

QueueTime is the time period returned on a lock request to an agent that is rejected. The QueueTime identifies how long the agent is willing to let the lock request stay queued.

Table 4 below summarizes lock requests, the constituent (i.e., client, lock management server, transaction manager, or lock agent) that issues them and the receiving constituent (i.e., client, lock management server, transaction manager, or lock agent). Each of the lock requests will be described in further detail below.

TABLE 4

| Lock/Transaction Request/Response | Issuing Constituent | Receiving Constituent |
|---|---|---|
| Begin Transaction | Client | Transaction Manager |
| Log Update | Client | Transaction Manager |
| Commit Transaction | Client | Transaction Manager |
| Rollback Transaction | Client | Transaction Manager |
| GrantTransactionId | Transaction Manager | Client |
| LogUpdated | Transaction Manager | Client |
| CommitDone | Transaction Manager | Client |
| RollbackDone | Transaction Manager | Client |
| ReleaseOperationId | Transaction Manager | Lock Manager |
| GetOperationId | Client | Lock Manager |
| LockRequest | Client | Lock Manager |
| ReleaseOperationId | Client | Lock Manager |
| LockRelease (*) | Client | Lock Manager |
| GrantOperationId | Lock Manager | Client |
| LockGrant | Lock Manager | Client |
| LockRefused | Lock Manager | Client |
| LockQueued | Lock Manager | Client |
| OperationIdReleased | Lock Manager | Client or Transaction Manager |
| LockReleased (*) | Lock Manager | Client |
| AgentRequest | Lock Manager | Lock Agent |
| AgentReleaseAll | Lock Manager | Lock Agent |
| AgentRelease (*) | Lock Manager | Lock Agent |
| AgentGrant | Lock Agent | Lock Manager |
| AgentRefuse | Lock Agent | Lock Manager |
| AgentAvail | Lock Agent | Lock Manager |
| AgentAllReleased | Lock Agent | Lock Manager |
| AgentReleased (*) | Lock Agent | Lock Manager |

Requests marked with an asterisk (*) are only used in the client controlled level of locking.

9.2 Client-Transaction Manager Requests/Responses

This section describes the request/response protocol between clients and the transaction manager.

In certain implementations, client requests include BeginTransaction, LogUpdate, CommitTransaction, and RollbackTransaction.

The BeginTransaction ( ) request is a message from a client requesting a operation id for a client operation that is to execute under the transaction control (and the transaction level of locking) The client asks for an operation id from one of the transaction management servers. In certain implementations, it would be the transaction management server on the client's system. The operation id generated by that transaction manager is used in requests to the transaction manager and Lock Management (LM) Group servers.

The LogUpdate (OperationId, Request, ReverseRequest) request is from the client to the transaction manager to log an update action and the action to take to reverse the update.

The CommitTransaction (OperationId) request is a message from a client to the transaction manager to initiate commit processing for the transaction.

The RollbackTransaction (OperationId) request is a message from a client to the transaction manager to initiate rollback processing for the transaction.

In certain implementations, the transaction management server supports the following response messages: GrantTransactionID, LogUpdated, CommitDone, and RollbackDone.

The GrantTransactionID (OperationId) response is in response to the BeginTransaction request. The transaction manager generates a unique operation id and returns the operation id to the Client. The prefix of the OperationId (i.e., the first part of the operation id) indicates that the operation id was generated by a transaction manager for a transaction.

The LogUpdated (OperationId, Request) response is from the transaction manager to the client that the transaction manager has completed a log an update action (as identified by the request).

The CommitDone (OperationId) response is a message from the transaction manager to the client that indicates that commit processing for the transaction identified by the OperationId has completed successfully. This message is sent in response to the CommitTransaction request.

The RollbackDone (OperationId) response is a message from the transaction manager to the client to indicate that a rollback has been completed for the transaction identified by the OperationId. This can be sent in response to either a CommitTransaction or a RollbackTransaction request.

9.3 Client-Lock Management Server Requests/Responses

This section describes the request/response protocol between clients and lock management servers.

In certain implementations, client requests include: GetOperationId, LockRequest, ReleaseOperationId, and LockRelease.

The GetOperationId ( ) request is a message from a locking aware client requesting an operation id for the operation that the client will be performing. The client asks for an operation id from one of the lock management group servers. The same operation id generated by that lock management server is used in requests to other lock management group servers. In a transaction enabled environment, the OperationId may be obtained using the BeginTransaction request and this request to the lock management server would not be issued. If the GetOperationId request is issued after a BeginTransaction request is issued, a second OperationId is generated.

The LockRequest (AgentRequest[ ], Type[ ], OperationId) request is a message from the locking aware client that requests one or more locks of the type (Read or Change) specified by the "Type" parameter. The locks are to be obtained on behalf of the operation id specified.

The ReleaseOperationId (OperationId) request is a message from the locking aware client that requests that all locks held by the operation id be released. This request is sent to each lock management group server that participates in the operation, although the operation id was obtained from one lock management group server. In a transaction enabled environment, the ReleaseOperationId request is effected by ending the transaction (e.g., done after Commit or Rollback), and it is not necessary for the client to issue the ReleaseOperationId command.

The LockRelease (AgentRequest[ ], OperationId) request is a message from the locking aware client that requests that specific locks be released. This command is valid for the client controlled level of locking. In certain implementations, there is not a 1-to-1 relationship between locks that were originally granted and locks that are being released. That is, the client does not necessarily release all locks at the same time.

In certain implementations, in response to the client requests, the lock management server supports the following response messages: GrantOperationId, LockGrant, LockRefused, LockQueued, OperationReleased, and LockReleased.

The GrantOperationId (OperationId) response is in response to the GetOperationId request. The Lock Management server generates a unique operation id and returns it to the Client.

The LockGrant (AgentResults[ ], OperationId) response in response to the LockRequest request from the client. The AgentResults identifies the locks granted on the resources requested and the type of lock granted. The AgentResults may differ from the AgentRequest. That is, the lock may have been escalated to a higher lock (e.g., a Read lock escalated to a Change lock). The LockGrant also returns the operation id in case the client has multiple operations started. The AgentResults return locks requested or locks escalated. The AgentResults does not include locks implied (via cascading locks). Thus, a client knows about objects for which the client requested locks. The client may not know about objects "below" the object locked. However, lock escalations are reported. Lock escalation refers to "upgrading" a lock that is held to either increase the scope of the lock or upgrade the type of the lock. Escalations could be from a Read to Change lock or from instance lock to Agent lock. Since a client may reasonably do optimization based on escalations (e.g., stop issuing lock request to an agent where the operation already holds an agent lock), the escalations are reported.

The LockRefused (AgentResults[ ], OperationId) response is in response to the LockRequest request from the client. If a lock cannot be granted, and the lock request times out on the queue, then the client will get this response. LockRefused also returns the operation id in case the client has multiple operations started.

The LockQueued (AgentResults[ ], OperationId) response is sent by the server in the case of lock requests that get queued. This response message does not necessarily require action on the part of the client, however, the LockQueued message informs the client that the operation is in a queued state. The OperationId returned identifies the operation that is experiencing the lock queuing.

The OperationReleased (OperationId) response is in response to the ReleaseOperationId request from the client. The OperationReleased also returns the operation id in case the client has multiple operations started.

The LockReleased (AgentResult[ ], OperationId) response is in response to the LockRelease request from the client. The AgentResult may be different than the AgentRequest in the LockRelease request. For example, if the agent had escalated an instance lock to an agent lock, the lock may not be released. AgentResult, could, in fact, be a null array. The LockReleased response applies to the client controlled locking level. For the transaction level of locking, LockRelease requests are rejected. For the isolation level of locking, a LockRelease request will cause the level of locking to drop to client controlled.

9.4 Lock Management Server-Agent Requests/Responses

This section describes a set of specific requests/responses between lock management servers and locking aware agents.

In certain implementations, lock management server Requests include AgentRequest, AgentReleaseAll, and AgentRelease.

The AgentRequest (AgentRequest[ ], OperationId) request is a lock request to the lock manager will translate to lock requests to individual agents. This request passes the lock request to the agent for those objects managed by the agent. The lock request to the agent passes the operation id to identify the client operation that is requesting the lock. Locks granted are held until explicitly released (via the AgentRelease request).

The AgentReleaseAll (OperationId) request is a request to release all (agent) locks held by the operation (client). The server does not have to explicitly list the locks to be released because the locks are implied by the operation id. That is, a lock agent is expected to keep locks for the operation and all locks held by the operation are released by the AgentReleaseAll request.

The AgentRelease (AgentRequest[ ], OperationId) request is a request to release selected locks held by the operation (client). This request would be issued if the client operation is executing under the client controlled level of locking In certain implementations, for transaction environments, there are three additional requests that are issued. The first is a "Prepare to Commit" request from the lock management server. A Prepare to Commit request is a transaction manager function for telling agents to be prepared to commit. That is, a Prepare to Commit request tells an agent that the transaction is about to end and that the agent should be prepared to commit or rollback. A confirmation from the agent means that the agent can go either way. The second request that the agent can get from the transaction manager is a "Rollback Agent" or "Commit Agent" request. In certain implementations, the transaction manager can drive the rollback by issuing "reverse" actions, rather than relying on agent intelligence to do rollbacks.

In certain implementations, agent responses include: AgentGrant, AgentRefuse, AgentAvail, AgentAllReleased, and AgentReleased.

The AgentGrant (AgentResult[ ], OperationId) response is in response to the AgentRequest. The AgentResult list can be shorter than the AgentRequest list. This implies that some of the requested locks will be refused (see below). The locks granted will show the CIMObjectPath and the type of lock granted (e.g., Read or Change). In certain implementations, AgentResults include lock escalations (e.g., Read locks escalated to Change locks, or instance locks escalated to agent locks), but AgentResults do not included implied or cascaded locks.

The AgentRefuse (AgentResult[ ], OperationId, QueueTime) response is issued by the agent if it refuses any lock requests. The locks that are refused are identified in the AgentResult and a QueueTime is provided. This is a time interval that the agent is willing to allow any of the refused locks to remain on the queue.

The AgentAvail (AgentResult[ ]) response tells the lock management server that a resource previously requested (and queued) is now available. The actual queuing is done in the lock management server. However, this message is needed to let the Lock management server know that a resource held by a locking unaware client is now available for locking.

The AgentAllReleased (OperationId) response is sent by the agent to the lock management server in reply to an AgentReleaseAll request.

The AgentReleased (AgentResult[ ], OperationId) response is the response the agent sends the lock management server in reply to an AgentRelease request. This, like the AgentRelease request is applicable to the client controlled level of locking 10.0 Discovery In certain implementations, an administrator sets up lock management servers and gives them each a unique lock management group value. The administrator then assigns lock management group values to agents. Each agent either belongs to no lock management group or to one lock management group. The default lock management group value for agents is "DefaultUnconfigured."

Lock management clients determine lock management group(s), their lock management servers, and lock management agent in the course of discovering services agents. This discovery process tells the client which lock management server to use to lock resources in the lock management agent. In certain implementations, it is an error for more than one lock management server to advertise itself to a discovery mechanism (i.e., a mechanism that maintains information in, for example, a directory on the resources of a network) as supporting one lock management group value. If a lock management server comes up and discovers another lock management server with the same lock management group value, it should not advertise itself.

If an agent comes up and there is no Lock management server for the Lock management group, then the agent will record its state as "not locking" enabled.

11.0 Lock Management Implementations

In certain implementations, lock management is implemented by all appropriate constituents implementing the locking design described herein, however, the locking coexists with non-locking constituents in the environment. In certain implementations, Lock Management is implemented in lock management servers and Lock Management Agents to effect a Locking environment, while locking in Clients is at the discretion of the client. The lock management server or Lock agent is able to cope with clients that do not do locking or locking unaware agents. Each of the cases are discussed further below.

11.1 Lock Unaware Clients

A lock unaware client is either a client that does not implement lock management for an operation or a client (e.g., a legacy client) that does not implement locking at all. When a lock aware agent receives an update request from a lock unaware client, the lock aware agent treats the operation as being locked (i.e., with a Change lock) for the duration of the operation to protect lock aware clients of the agent. That is, if the action updates the model, then the implied lock is a Change lock on the resource affected by the request. If the operation is a read, the agent may treat the action as a "no lock" read. In essence, if a lock unaware client attempts to update any part of the object model represented with CIM, the lock unaware client can be blocked (i.e., request rejected).

If no locking aware client holds a lock on the resource being modified by the lock unaware client, the request is allowed to execute. However, a Change lock (or equivalent) is implied, such that any lock request from a locking aware client is blocked. In the case of the lock request from the locking aware client, the lock request can be queued. The agent returns a queue time value to be used in queuing the lock request. Because the locking unaware client did not go through the lock manager, the agent issues the AgentAvail message to the lock manager when the lock unaware client is done.

11.2 Lock Unaware Agents/Object Managers

A lock unaware agent or object manager is either an agent or object manager that does not implement lock management.

In certain implementations, lock unaware Common Information Model—Extensible Markup Language (CIM-XML) servers (i.e., CIM servers having CIM object managers and agents) do not support additional intrinsic methods for granting and releasing locks. Clients that discover these legacy roles will handle invariant operations as if they were lock unaware clients.

12.0 Lock Management Client

Clients recognize the locking environment that they are operating in. First, clients recognize the presence or absence of lock managers. Then, clients recognize the presence or absence of a transaction manager. If all agents are locking aware and there is a transaction manager present, then the agents can use the transaction level of locking. If a transaction manager is not present, then the agents use the isolation level or the client controlled level or do no locking at all.

If there are agents in the configuration that are locking unaware agents, the client recognizes that any actions on those agents will not be protected. Additionally, the client understands that an operation that is doing transaction or isolation levels of locking will not have that capability with respect to the locking unaware agents.

The client decides which level of locking to use in any given operation. For concurrency and scalability, it is desirable for the client to use the "least" level of locking to support the operation. For example, if a client is surveying a SAN for available storage (i.e., for a pure read operation), it would be desirable for the client to use no locking at all. If the client is surveying storage available to create a volume, then the isolation level is sufficient to guarantee storage found can, in fact, be used to create the volume.

The use of the transaction level of locking is reserved for complex operations that involve multiple updates that need to be coordinated, perhaps over multiple agents in the SAN.

A client that chooses to execute an operation under one of the levels of locking begins the operation by requesting an operation id from the transaction manager or one of the lock managers that the client will use. The operation id may be requested from any lock manager, however, it is more efficient if the client requests the operation id from one of the lock managers the client is using.

The rules for lock management clients are summarized as follows:

(1) Clients inventory the Agents, lock management servers and transaction managers that the clients will have to deal with in the operation to determine if all the agents are covered by locking and if the locking environment is transaction enabled. Whether or not an operation can be coded as a locking operation and the level of locking used can vary by operation. That is, the client gets to choose the level of locking that the client will use based on the client's understanding of what the operation will require.

(2) The lock management client obtains a lock on a resource before the client attempts an action on the resource. However, this may be done just before the action is performed. In certain implementations, it is not necessary to obtain all locks before any actions are performed, and there is an exception for "Create" requests. Change locks will be implied on "Create" requests.

(3) A single lock management request include references to agents that are in the same lock management group.

(4) A lock management client releases locks when the operation is done. This will be done automatically for the client if the client is using the transaction manager (i.e., releasing locks is implied by commit or rollback).

(5) A lock management client does "recovery" and releases locks in the event that any lock request is refused. That is, if a lock request is refused, existing locks held by the operation are kept to allow the application to attempt its own "undo" or to invoke the transaction manager Rollback function. As soon as either is done, locks are released.

(a) The lock management client that is running at the isolation or client controlled levels of locking is responsible for "undoing" any part of the operation that was done before any failure condition is encountered.

(b) If a lock management client attempts to obtain a lock and the attempt fails, the lock management client may retry the lock attempt. In certain implementations, this is not recommended and the lock management server may enforce this rule by refusing the lock for the operation id on a retry attempt.

13.0 Lock Management Server

The locking process involves a lock manager (e.g., a lock management server) that maintains state information for locking. This means that lock requests are managed by the lock management server and conflicts are dealt with at the lock management server level. A lock management server can detect obvious conflicts and queue requests without having to consult with agents. The lock manager maintains, for example, the following state information:

Locks held by a client (operation id)
Agents with locks for a client (operation id)
Lock queues (client lock requests that are queued behind other lock requests)
Lock queue timeout In the locking design, one lock management server is active for any given lock management group. An agent belongs to one lock management group. In certain implementations, the locking design supports the notion of an agent that does not belong to any lock management group, however, resources managed by such an agent are not under locking control.

If a lock management server, during its discovery of lock manager agents, finds another active lock management server with the same lock management group value, the lock management server does not activate itself. However, the lock management server may initiate communications with the other lock management server with the same lock management group value and establish itself as a backup lock management group server for the lock management group value.

An lock management server recognizes the environment it is running in. Specifically, the lock management server discovers other lock management group servers, verifying that the lock management server is the only lock management server for its lock management group value. Also, the lock management server discovers all the agents that have the same lock management group value.

A lock management server is enabled to perform the following functions:

(1) Support and enforce the level of locking (transaction, isolation or client controlled). Specifically, if the OperationId is a transaction id (i.e., prefix is on), then the lock manager will not support releasing of locks before the end of the transaction. In the case of isolation versus client controlled levels, the lock manager will assume the isolation level until the client releases individual locks. Then, the lock manager will mark the operation as client controlled.

(2) Generate OperationIds. The server is able to generate operation ids to identify client operations for the isolation and client controlled levels of locking. In certain implementations, the OperationId is a compound value. The first part of the value indicates that the operation is not a transaction, the second part is the lock management group value, and the third part of the value is an identifier that is unique within the lock management group. The identifiers are integers in the range of 0 to $2^{32}-1$. This allows sufficient distance to avoid reuse in the same time frame.

(3) Keep a record of which locks held by recording which resources (e.g., CIMObjectPaths) are held by which holders (OperationIds) and also maintain a record of lock requests that are queued.

(4) Recover locks after failure of the lock manager or lock agents. Also, recover lock queues.

(5) Queue Lock Requests that are blocked. The allowable queue time is supplied by the agent that would have locked the resource. The lock management server monitors time on queue to honor agent stated queue time. If the queue time expires before the operation gets the lock, then the client is returned a lock refused message.

(6) Release locks when asked to by the client. Lock management servers use a heartbeat function with agents and clients to release locks in the event of failures (e.g., client, agent or communications failures). A heartbeat function is, for example, a signal that is sent from the server to the clients and agents and a response to the signal indicates that the client or agent responding is functioning properly.

In certain implementations, lock management servers also implement communications with other lock managers to effect lock management failover.

13.1 Lock Management Server Features

In certain implementations, the minimal lock management server would have the following characteristics and features:
(1) Accept lock management server requests and provide the prescribed responses.
(2) Drive lock management agent requests and process their responses.
(3) Be stateful when supporting locking aware client operations.
(4) Be subject to single points of failure, but also be designed to support lock management server failover.
(5) Perform functions within own lock management group scope.

13.2 Lock Manager Optional Enhancements

In certain implementations, the lock manager can be designed to support the following:
(1) Highly available lock management server.
(2) Transactional lock management server.

14.0 Lock Management Agent Considerations

Locking aware agents are prepared to operate in either locking mode or no lock mode. What locking aware agents will be asked to do will vary by operation.

During initial discovery, locking aware agents look for their lock management group server. If the lock management group server is found, the locking capability of the agent is enabled. If the lock management group server is not found, then the agent operates in no lock mode.

In certain implementation, the rules that lock management agents need to follow when processing lock requests are:
(1) Hold all locks granted until explicitly released.
(2) Block actions from locking unaware clients that would conflict with locks held by locking aware clients.
(3) Notify (via AgentAvail) its lock management server when a resource is available after refusing a lock request due to use by a locking unaware client.

15.0 Lock Management Use Cases

To illustrate the locking design, a set of scenarios for client operations will be described. Lock logic is described for each of the following scenarios:
(1) Create volume on a virtualization system with insufficient storage.
(2) Move storage from one virtualization system to another.
(3) Move storage from a virtualization system to a host based virtualization.
(4) Create a logical volume on a logical volume manager and provision it from a virtualization subsystem and a disk array.

15.1 Create Volume on Virtualization System

Figure 4A:
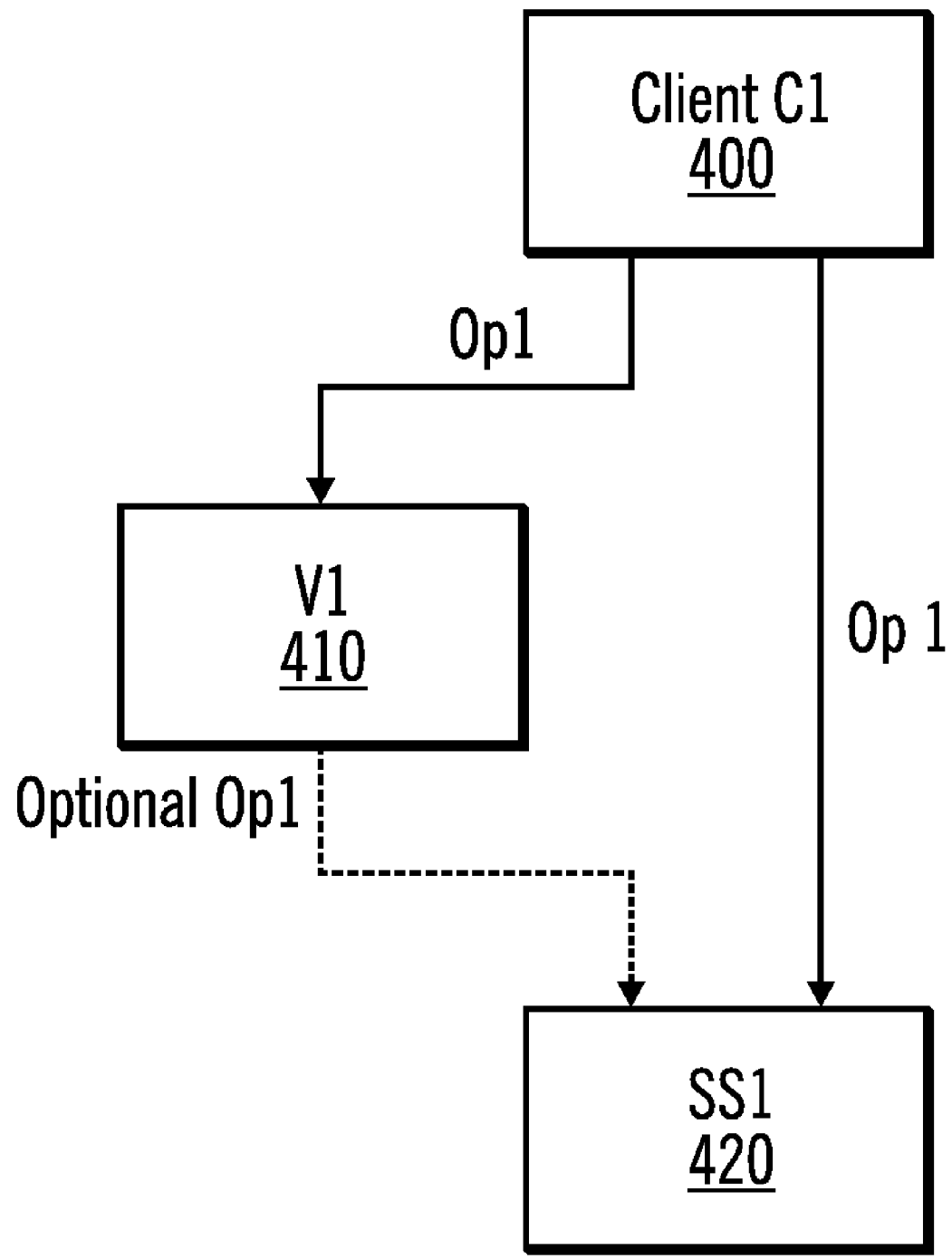
FIG. 4A illustrates creation of a volume on a virtualization system with insufficient storage in accordance with certain implementations of the invention.

FIG. 4A illustrates creation of a volume on a virtualization system with insufficient storage in accordance with certain implementations of the invention. The client (C1) 400 is attempting to create a volume on the virtualization subsystem (V1) 410, but the virtualization subsystem 410 does not have sufficient storage to create the volume. So the client 400 first obtains storage from the disk array SS1 420. The storage is allocated to V1 410, and then the storage may be used on V1 410. The actions are associated with operation id1 (Op1). The specific steps of this operation are:
(1) Create a volume on SS1 420 (e.g., via a StorageConfigurationService statement from CIM)—This involves locking the storage pool in SS1 420 and issuing the create volume service. The assumption in this scenario is that the virtualization subsystem 410 does not do automatic provisioning of storage. Creating the volume on SS1 420 is done by the client 400.
(2) Assign the volume to V1 410—The volume just created is assigned (i.e., logical unit number (LUN) Mapped) to V1 410. The assumption is that the volume is not controlled by V1 410 until the client 400 maps the volume to V1 410.
(3) Extend a storage pool on V1 410 by adding the volume to the pool—The volume assigned to V1 410 shows up in the V1 410 object model as an extent. The client 400 adds the extent to the V1 410 storage pool that is to house the new V1 410 volume.
(4) Create a LUN on V1 410—The client 400 actually creates the volume on V1 410.

Figure 4B:
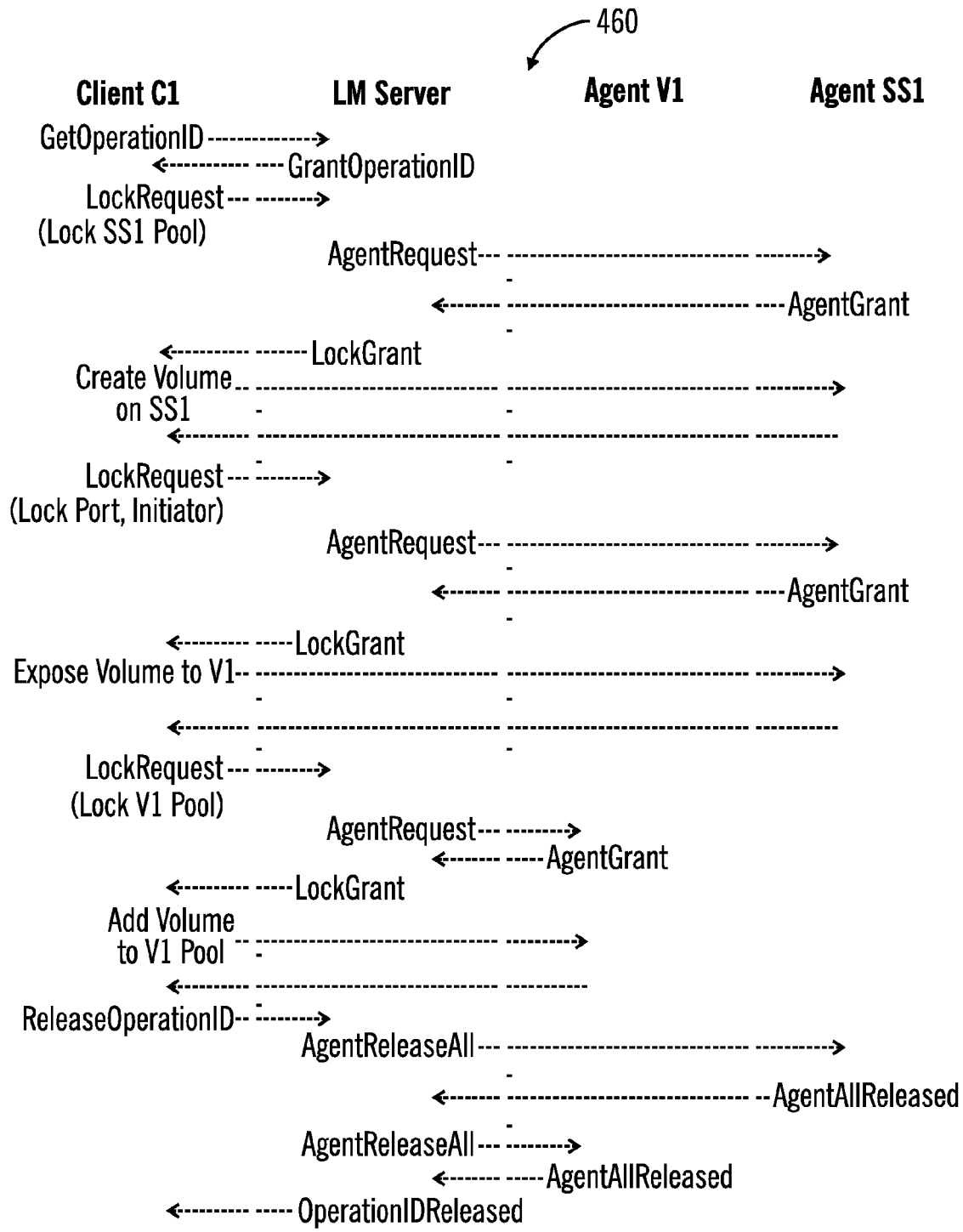
FIG. 4B illustrates a table of locking steps and major client action requests in a sequence of actions for creation of a volume on a virtualization system with insufficient storage in accordance with certain implementations of the invention.

FIG. 4B illustrates a table 460 of locking steps and major client action requests in a sequence of actions for creation of a volume on a virtualization system with insufficient storage in accordance with certain implementations of the invention.

15.2 Move Storage from One Virtualization System to Another

Figure 5A:
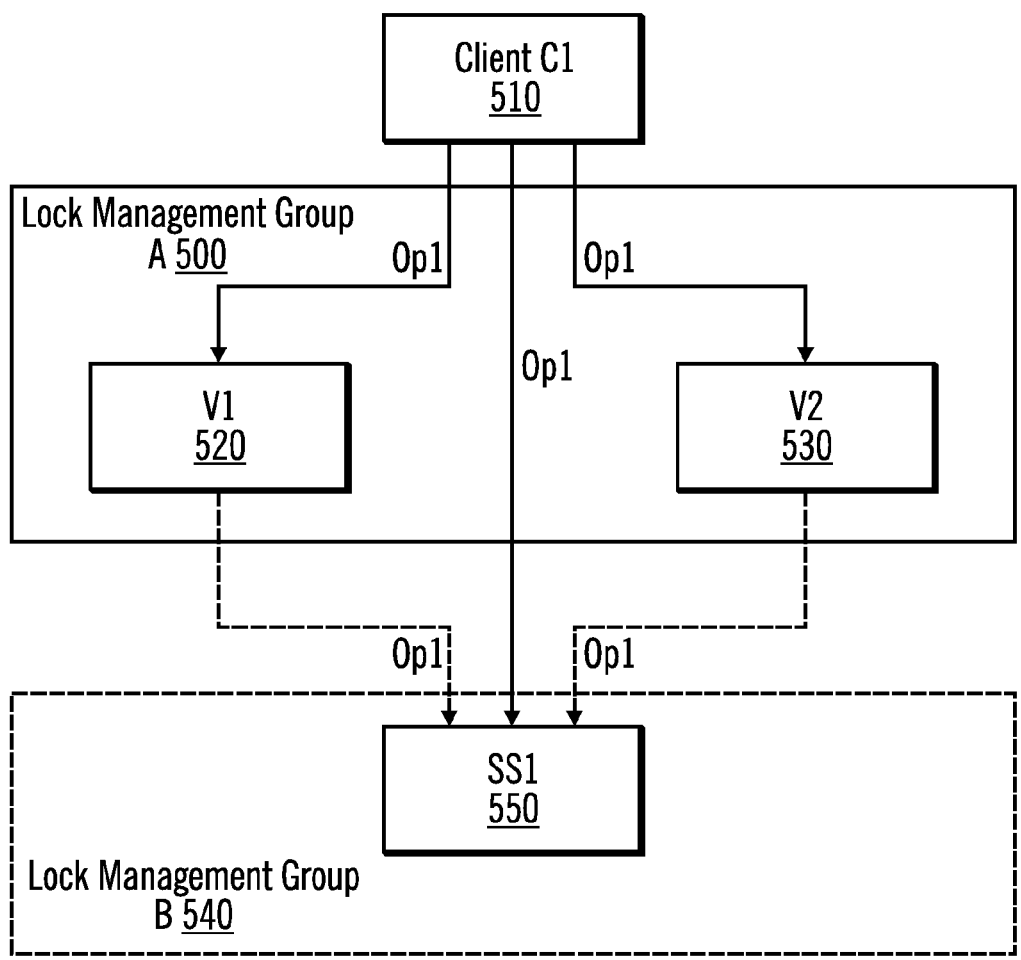
FIG. 5A illustrates movement of storage from one virtualization system to another in accordance with certain implementations of the invention.

FIG. 5A illustrates movement of storage from one virtualization system to another in accordance with certain implementations of the invention. The client (C1) 510 is attempting to move storage from one virtualization system (V1) 520 to another virtualization system (V2) 530 in lock management group A 500. To do this, the client 510 frees up storage on V1 520 and then assigns the freed storage to V2 530. The storage that is released form V1 520 is held by array SS1 550 in lock management group B 540. The actions are associated with operation id1 (Op1). The specific steps of this operation are:
(1) Delete extent on V1 520 (StorageConfigurationService)—This involves locking the storage pool in V1 520 and issuing the delete extent service. The assumption in this scenario is that locking the storage pool locks the extents of the storage pool.
(2) Unmap the SS1 550 volume from V1 520—This involves locking the SS1 550 volume and the ports/initiator to which the volume was mapped. The assumption here is that the objects involved in the mapping are what need to be locked (as seen by the map request).
(3) Map the SS1 550 volume to V2 530—The operation already holds the lock on the volume, but the operation also locks the new port/initiator for V2 530.
(4) Add the extent (SS1 550 volume) to V2 530 storage pool. (StorageConfigurationService)—This involves locking the storage pool on V2 530.

Figure 5B:
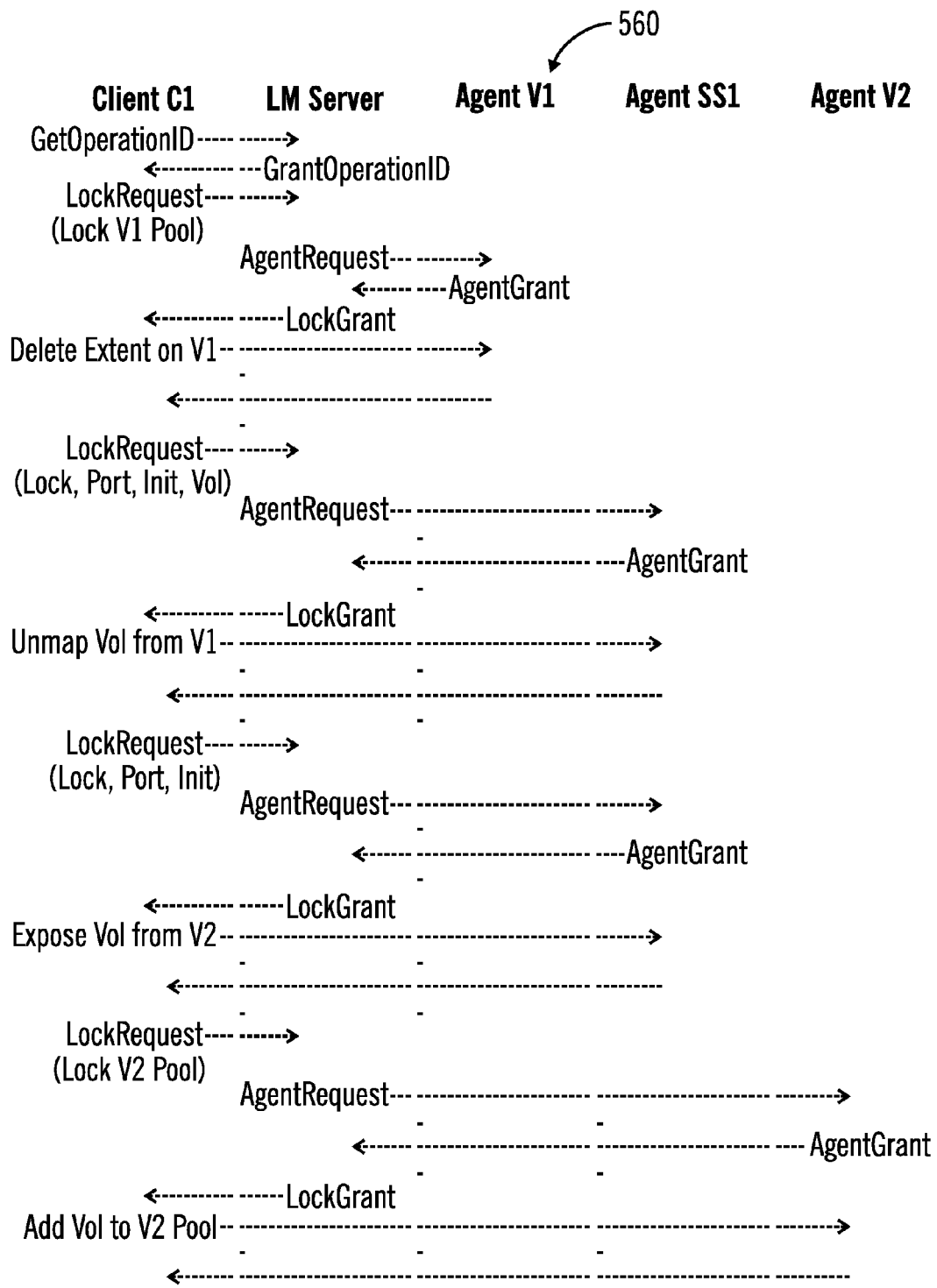
FIGS. 5B and 5C illustrate a table of locking steps and major client action requests in a sequence of actions taken under the isolation level of locking for movement of storage from one virtualization system to another in accordance with certain implementations of the invention.
Figure 5C:
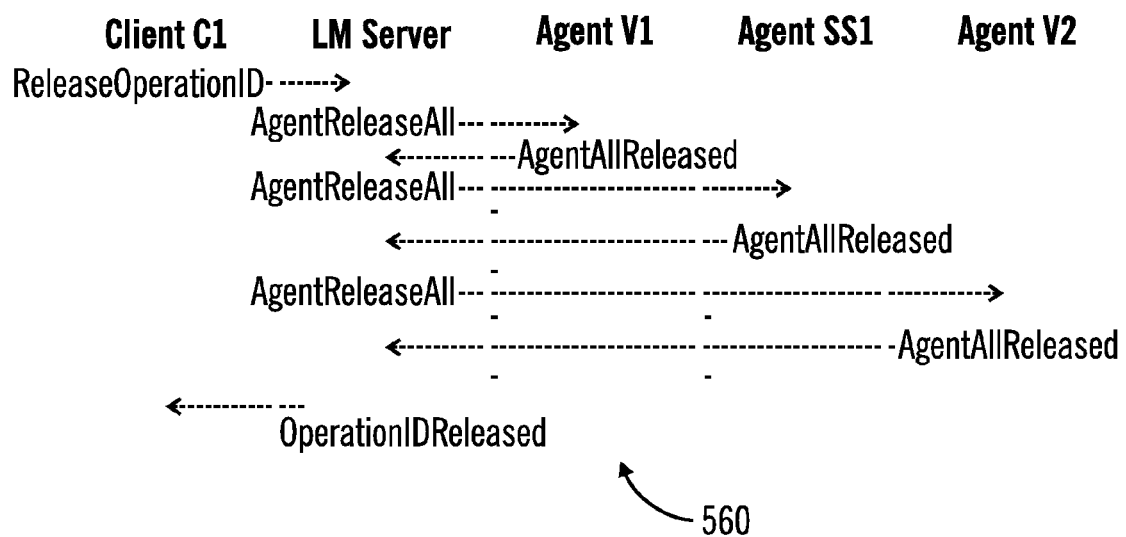

FIGS. 5B and 5C illustrate a table 560 of locking steps and major client action requests in a sequence of actions taken under the isolation level of locking for movement of storage from one virtualization system to another in accordance with certain implementations of the invention.

15.3 Move Storage from a Virtualization System to a Logical Volume

Figure 6A:
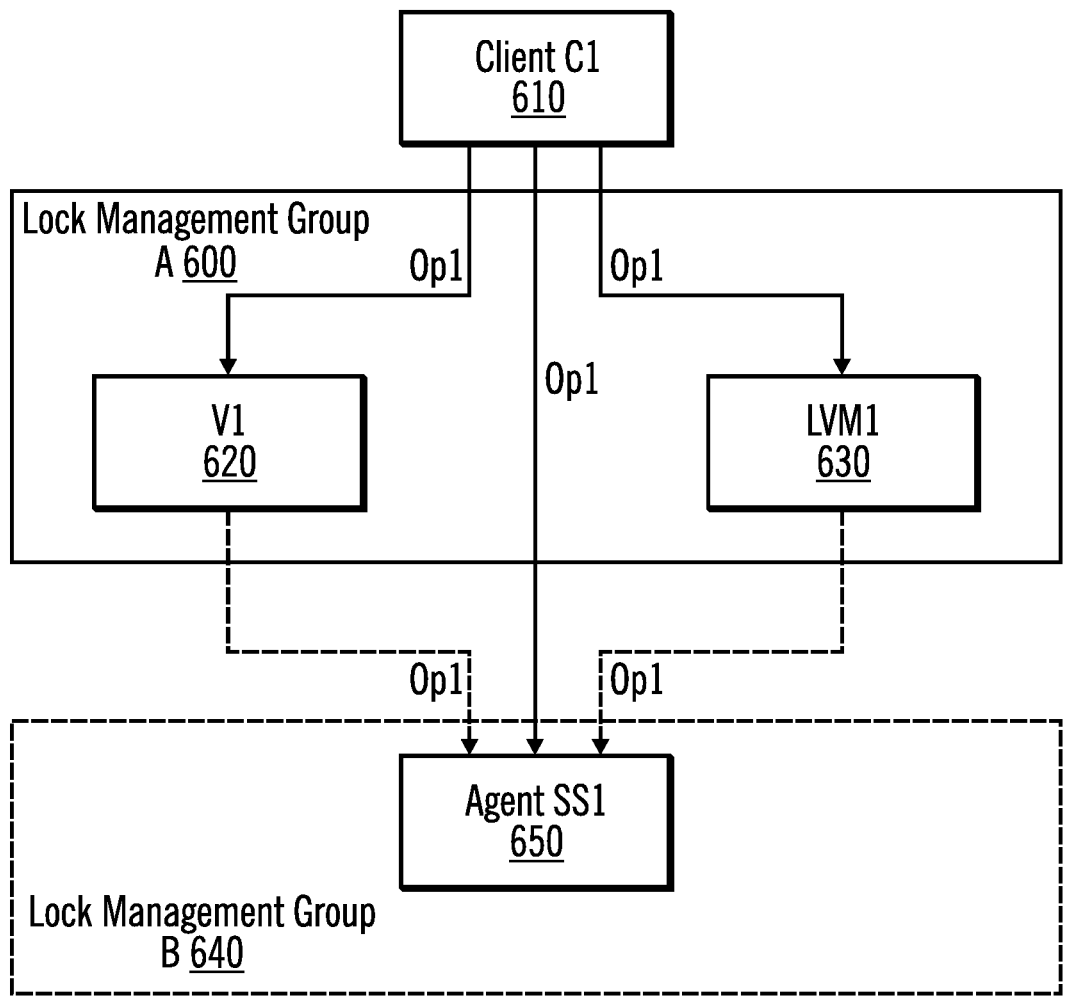
FIG. 6A illustrates movement of storage from a virtualization system to a logical volume manager in accordance with certain implementations of the invention.

FIG. 6A illustrates movement of storage from a virtualization system to a logical volume manager in accordance with certain implementations of the invention. The client (C1) 610 moves storage from one virtualization system (V1) 620 to the logical volume manager (LVM1) 630 in lock management group A 600. To do this, the client 610 frees up storage on V1 620 and then assigns the freed storage to LVM1 630. The storage that is released form V1 620 is held by array SS1 650 in lock management group B 640. The actions are associated with operation id1 (Op1). The specific steps of this operation are:
(1) Delete extent on V1 620 (StorageConfigurationService)—This involves locking the storage pool in V 1620 and issuing the delete extent service. The assumption in this scenario is that locking the storage pool locks the extents of the storage pool.
(2) Unmap the SS1 650 volume from V1—This involves locking the SS1650 volume and the ports/initiator to which the volume was mapped. The assumption here is that the objects involved in the mapping are what need to be locked (as seen by the map request).
(3) Map the SS1 650 volume to LVM1 630—The operation already holds the lock on the volume, but the operation also locks the new port/initiator for LVM1 630.
(4) Add the extent (SS1 640 volume) to LVM1 630 logical volume group (storage pool) (StorageConfigurationService)—This involves locking the logical volume group on LVM1 630.

Figure 6B:
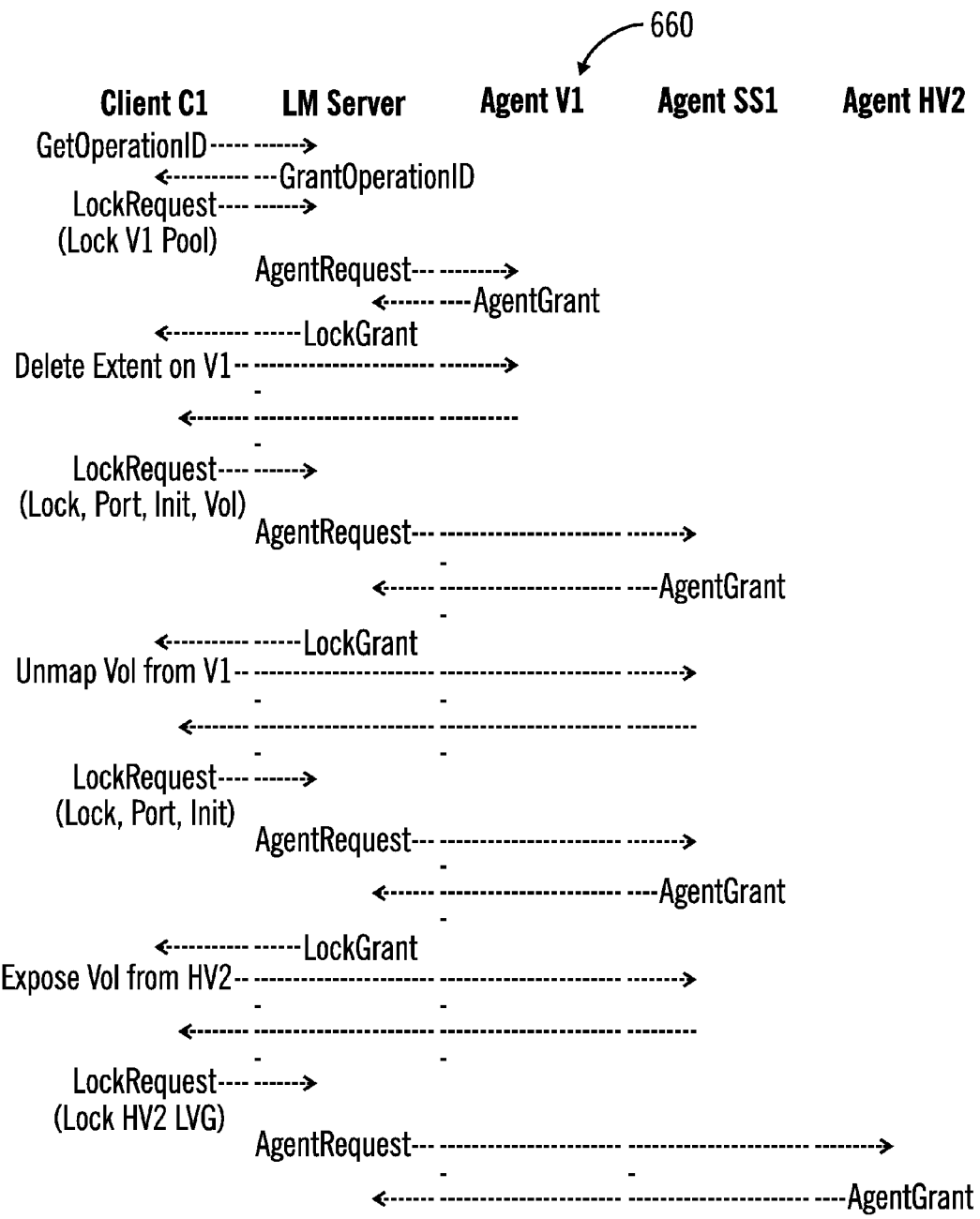
FIGS. 6B and 6C illustrate table of locking steps and major client action requests in a sequence of actions taken under the isolation level of locking for movement of storage from a virtualization system to a logical volume manager in accordance with certain implementations of the invention.
Figure 6C:
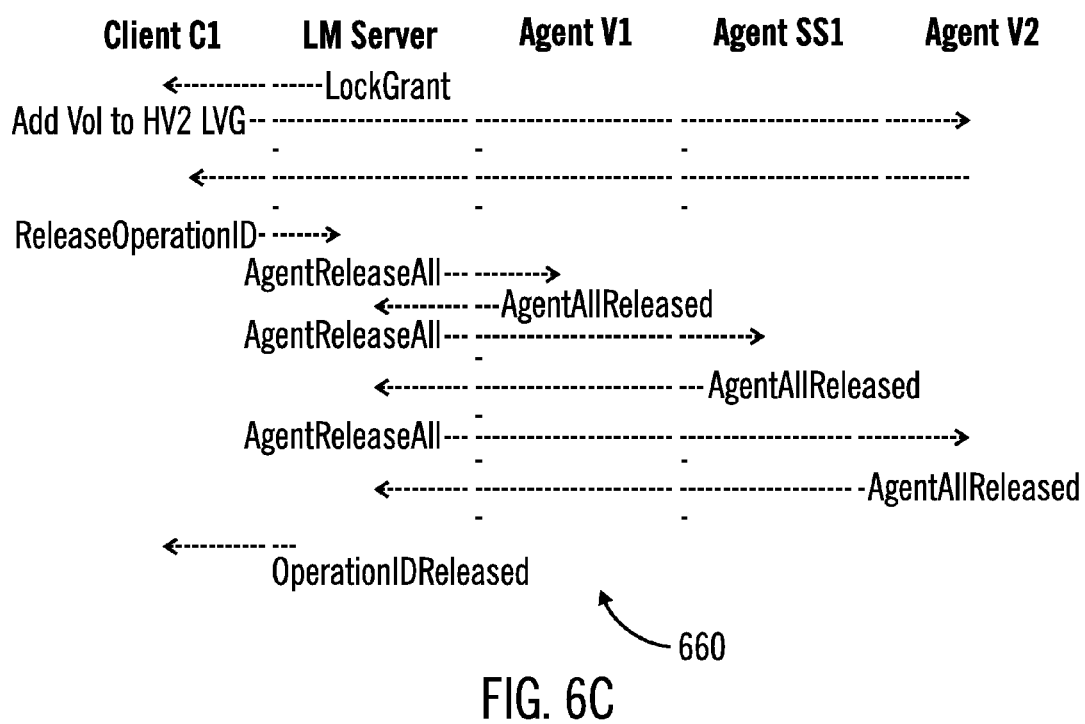

FIGS. 6B and 6C illustrate table 660 of locking steps and major client action requests in a sequence of actions taken under the isolation level of locking for movement of storage from a virtualization system to a logical volume manager in accordance with certain implementations of the invention.

15.4 Create a Logical Volume and Provision it from Multiple Sources

Figure 7A:
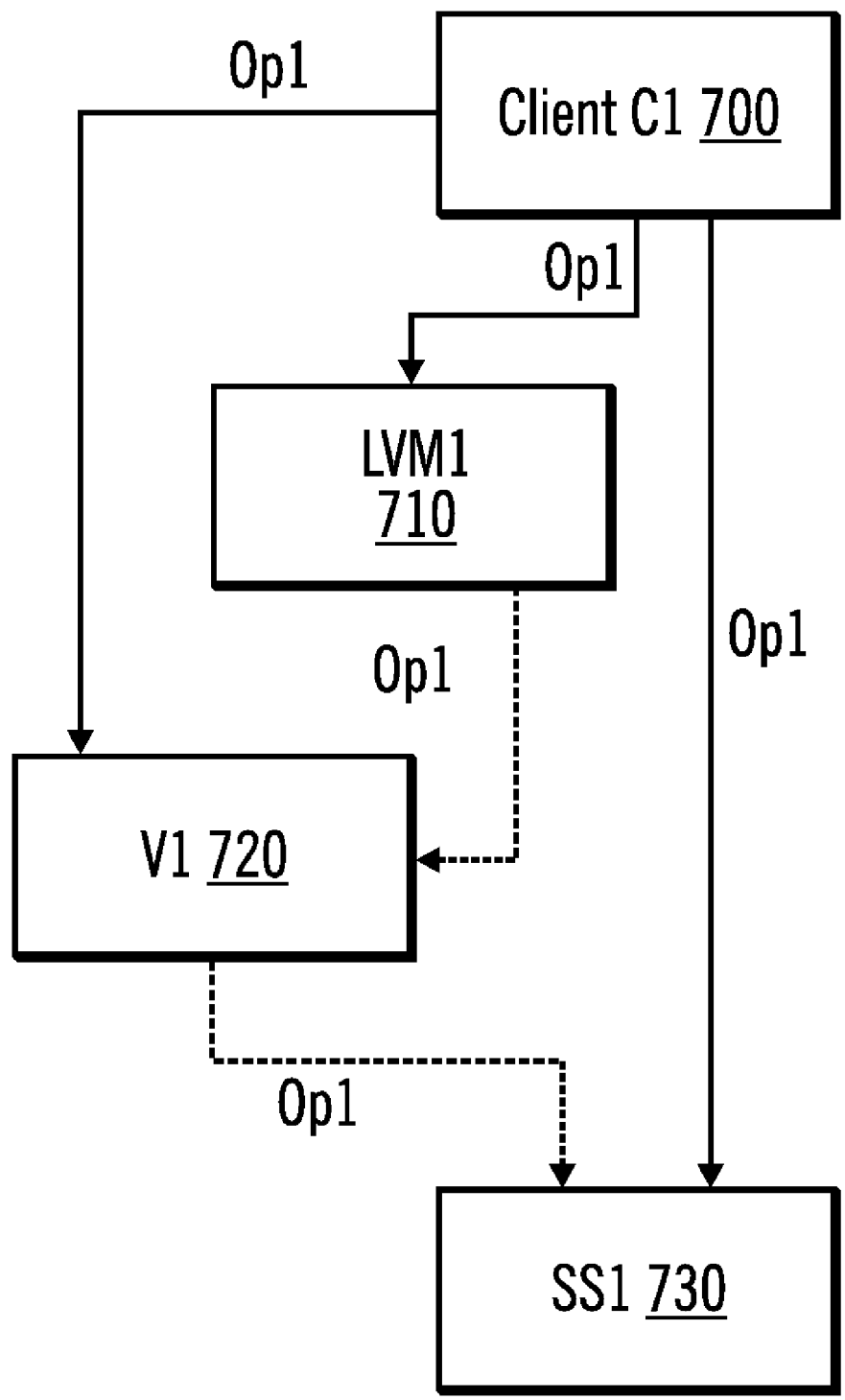
FIG. 7A illustrates creation of a logical volume and provision of the logical volume from multiple sources in accordance with certain implementations of the invention.

FIG. 7A illustrates creation of a logical volume and provision of the logical volume from multiple sources in accordance with certain implementations of the invention. The client (C1) 700 is attempting to create a logical volume and provision the logical volume from multiple sources. Specifically, the client 700 wants to get the storage from a virtualization system (V1) 720 and a storage array (SS1) 730. The actions are associated with operation id1 (Op1). The specific steps of this operation are:
(1) Create volume on V1 720 (StorageConfigurationService)—This involves locking the storage pool in V1 720 and issuing the create volume service.
(2) Expose (i.e., map) the V1 720 volume to the host (i.e., logical volume manager1 (LVM1) 710)—This involves locking the V1 720 volume and the ports/initiator to which the volume was mapped. The assumption here is that the objects involved in the mapping are what need to be locked (as seen by the map request).
(3) Create volume on SS1 730 (StorageConfigurationService)—This involves locking the storage pool in SS1 730 and issuing the create volume service.
(4) Expose (i.e., map) the SS1 730 volume to the host (i.e., LVM1)—This involves locking the SS1 730 volume and the ports/initiator to which the volume was mapped. The assumption here is that the objects involved in the mapping are what need to be locked (as seen by the map request).
(5) Add the logical disks (i.e., extents) to LVM1 710 logical volume group (storage pool) (StorageConfigurationService)—This involves locking the logical volume group on LVM1 710.

Figure 7B:
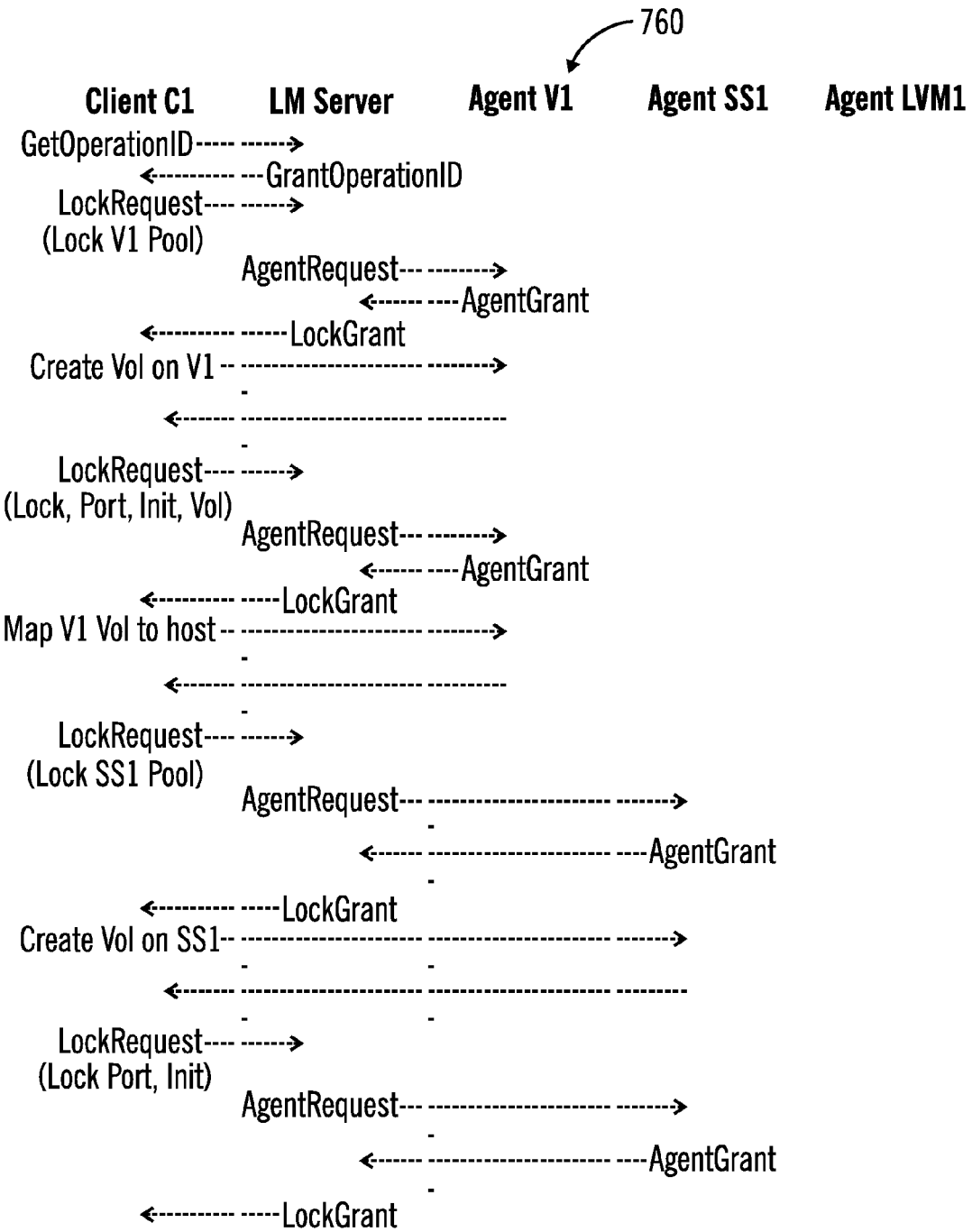
FIGS. 7B and 7C illustrate table of locking steps and major client action requests in a sequence of actions taken under the isolation level of locking for creation of a logical volume and provision of the logical volume from multiple sources in accordance with certain implementations of the invention.
Figure 7C:
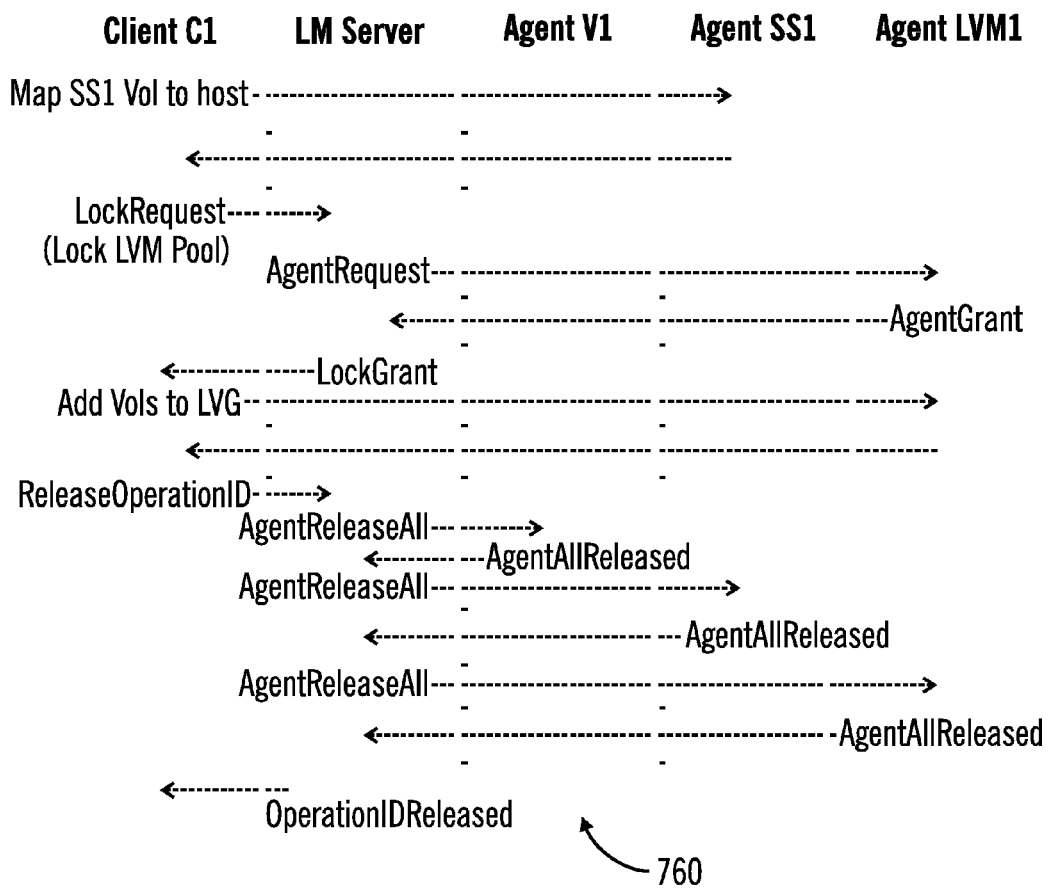

FIGS. 7B and 7C illustrate table 760 of locking steps and major client action requests in a sequence of actions taken under the isolation level of locking for creation of a logical volume and provision of the logical volume from multiple sources in accordance with certain implementations of the invention.

16.0 Lock and Transaction Management

Figure 8:
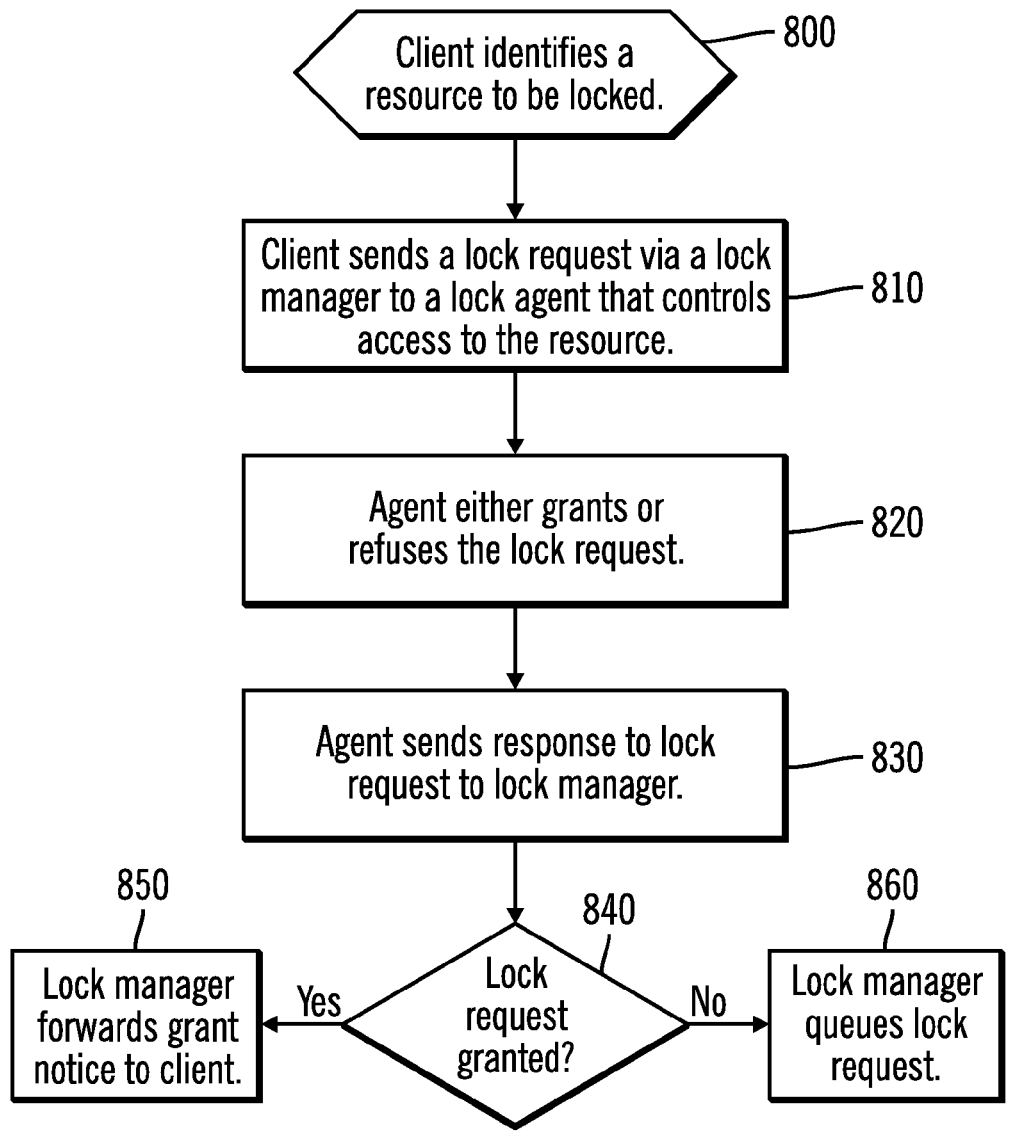
FIG. 8 illustrates logic implemented to process a lock in the lock and transaction management (LTM) system in accordance with certain implementations of the invention.

FIG. 8 illustrates logic implemented to process a lock in the LTM system in accordance with certain implementations of the invention. Control begins at block 800 with a client identifying a resource to be locked. The client also knows which agent controls access to the resource (i.e., "controls the resource"), and the client sends a lock request via a lock manager to the lock agent that controls access to the resource (block 810). The agent either grants or refuses the lock request (820), and the agent sends a response to the lock request to the lock manager (830). The lock manager determines whether the lock request was granted (block 840). If the lock request was granted, the lock manager forwards a grant notice to the client (block 850), otherwise, the lock manager queues the lock request (block 850).

Figure 9:
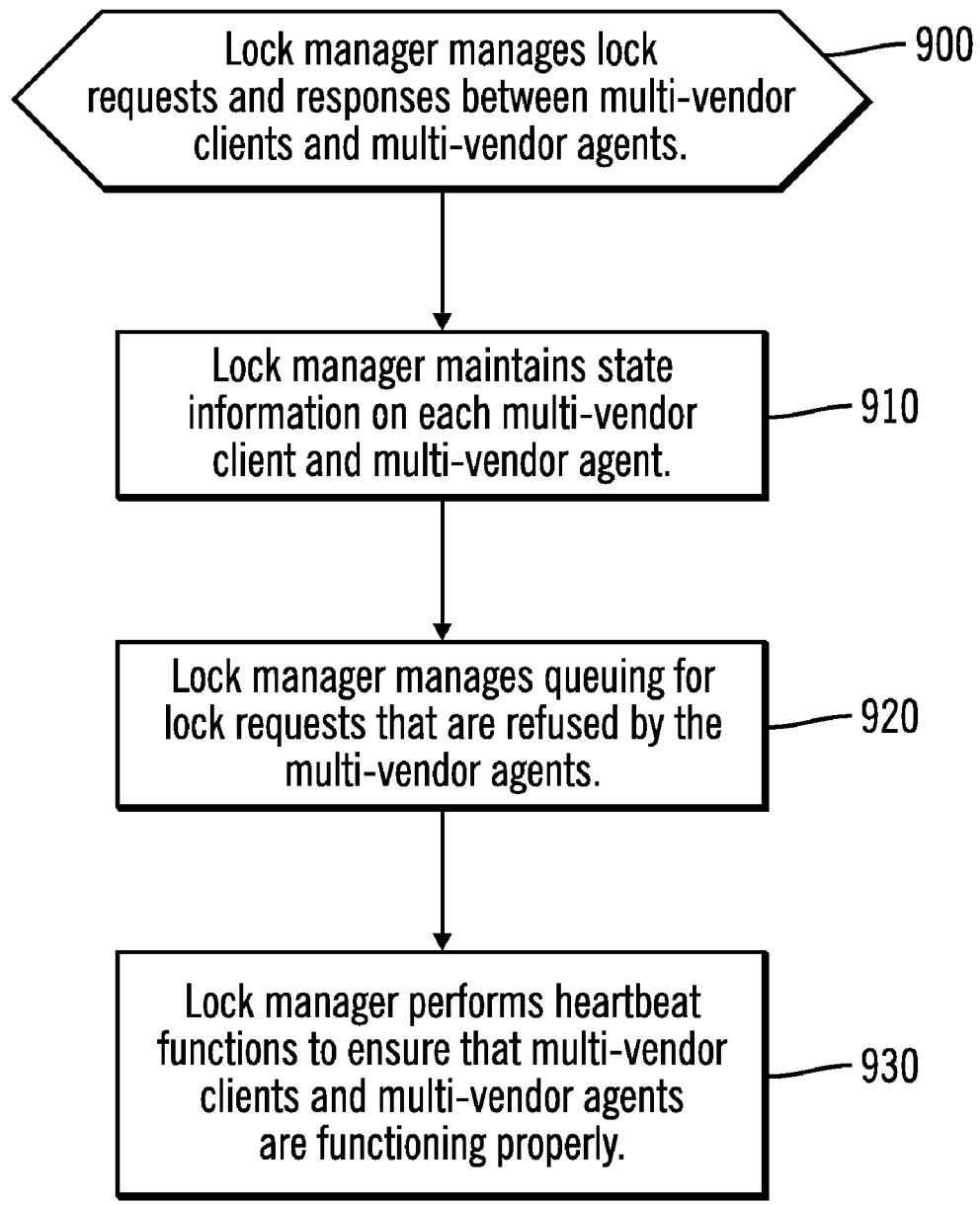
FIG. 9 illustrates logic implemented by a lock manager in accordance with certain implementations of the invention.

FIG. 9 illustrates logic implemented by a lock manager in accordance with certain implementations of the invention. Control begins at block 900 with the lock manager managing lock requests received from multi-vendor clients and directed to multi-vendor agents and managing responses from the multi-vendor agents to the multi-vendor clients. In a multi-vendor environment, each one of multiple vendors attempts to implement the same logic in roles (e.g., agents or clients) developed by all vendors. A typical SAN environment includes a multi-vendor environment. Thus, the term "multi-vendor clients" is used to indicate that each of the clients or subsets of clients may have been developed by a different vendor. The term "multi-vendor agents" is used to indicate that each of the agents or subsets of agents may have been developed by a different vendor.

The lock manager maintains state information on each multi-vendor client and multi-vendor agent (block 910). The lock manager manages queuing for lock requests that are refused the multi-vendor agents (block 920). The lock manager performs heartbeat functions to ensure that the multi-vendor clients and multi-vendor agents are functioning properly (block 930).

Figure 10:
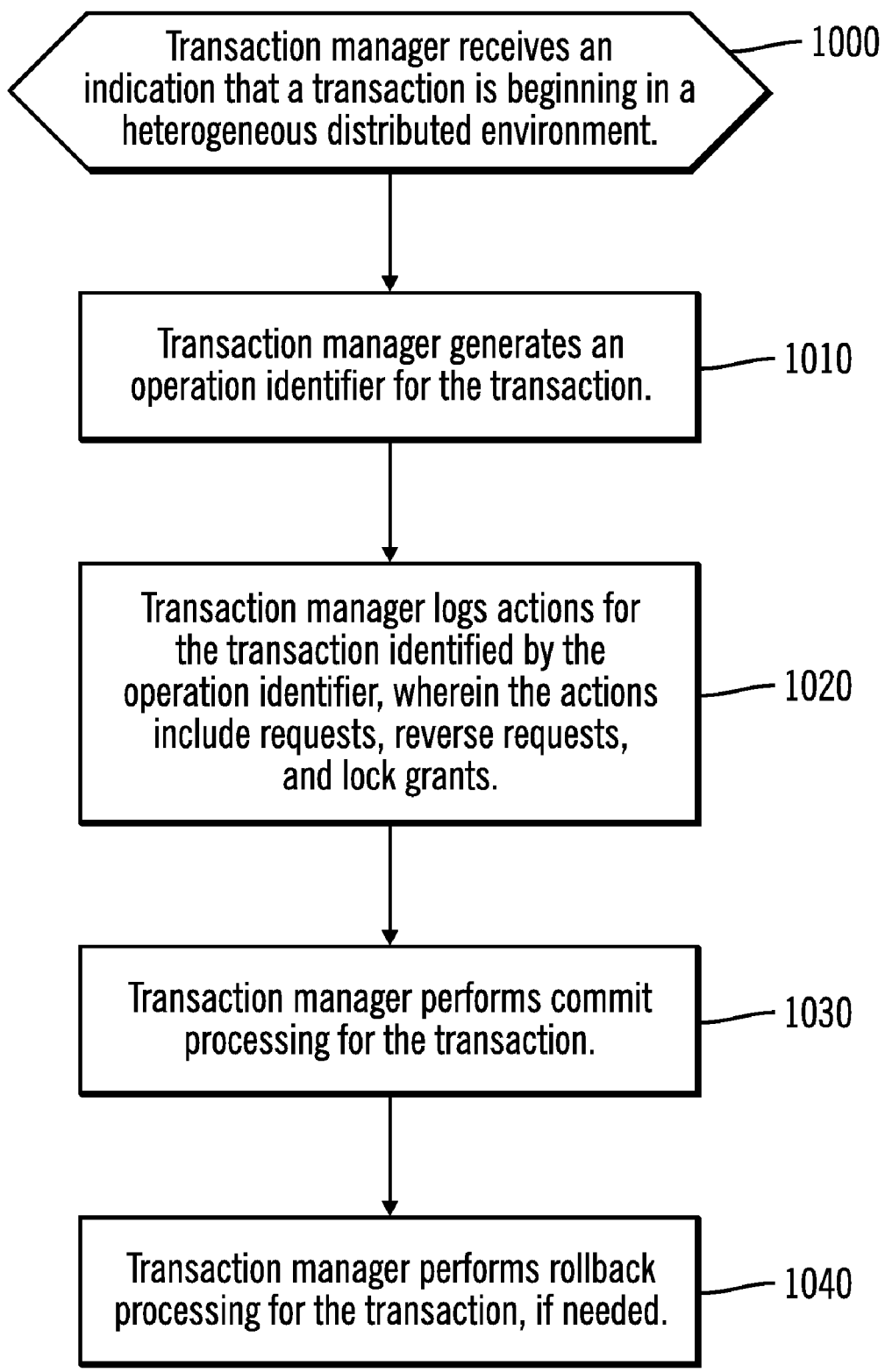
FIG. 10 illustrates logic implemented by a transaction manager in accordance with certain implementations of the invention.

FIG. 10 illustrates logic implemented by a transaction manager in accordance with certain implementations of the invention. Control begins at block 1000 with the transaction manager receiving an indication that a transaction is beginning in a heterogeneous distributed environment. A heterogeneous distributed environment is one in which the client, transaction manager, lock manager, and agent or a subset of these roles may be from the same or different vendors. In block 1010, the transaction manager generates an operation identifier for the transaction. In block 1020, the transaction manager logs actions for the transaction identified by the operation identifier, and the actions include requests, corresponding reverse requests (for use in rollback), and lock grants. For example, a request may be to "create VolumeX," in which case a corresponding reverse request would be "delete VolumeX." In block 1030, the transaction manager performs commit processing for the transaction. In block 1040, the transaction manager performs rollback processing for the transaction, if needed.

Figure 11A:
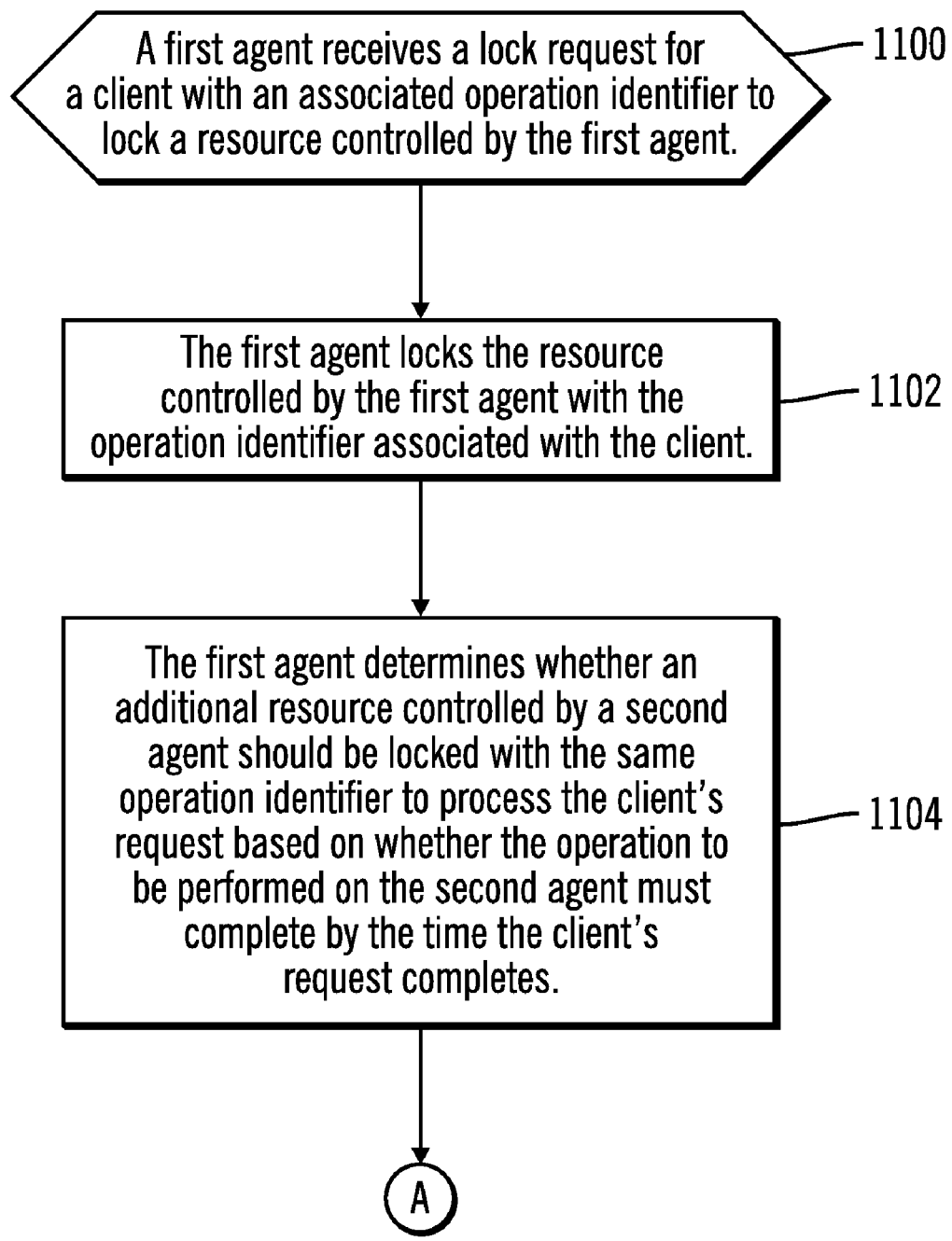
FIGS. 11A and 11B illustrate logic performed by cascading agents when determining which operation identifier is to be used to lock a resource in accordance with certain implementations of the invention.
Figure 11B:
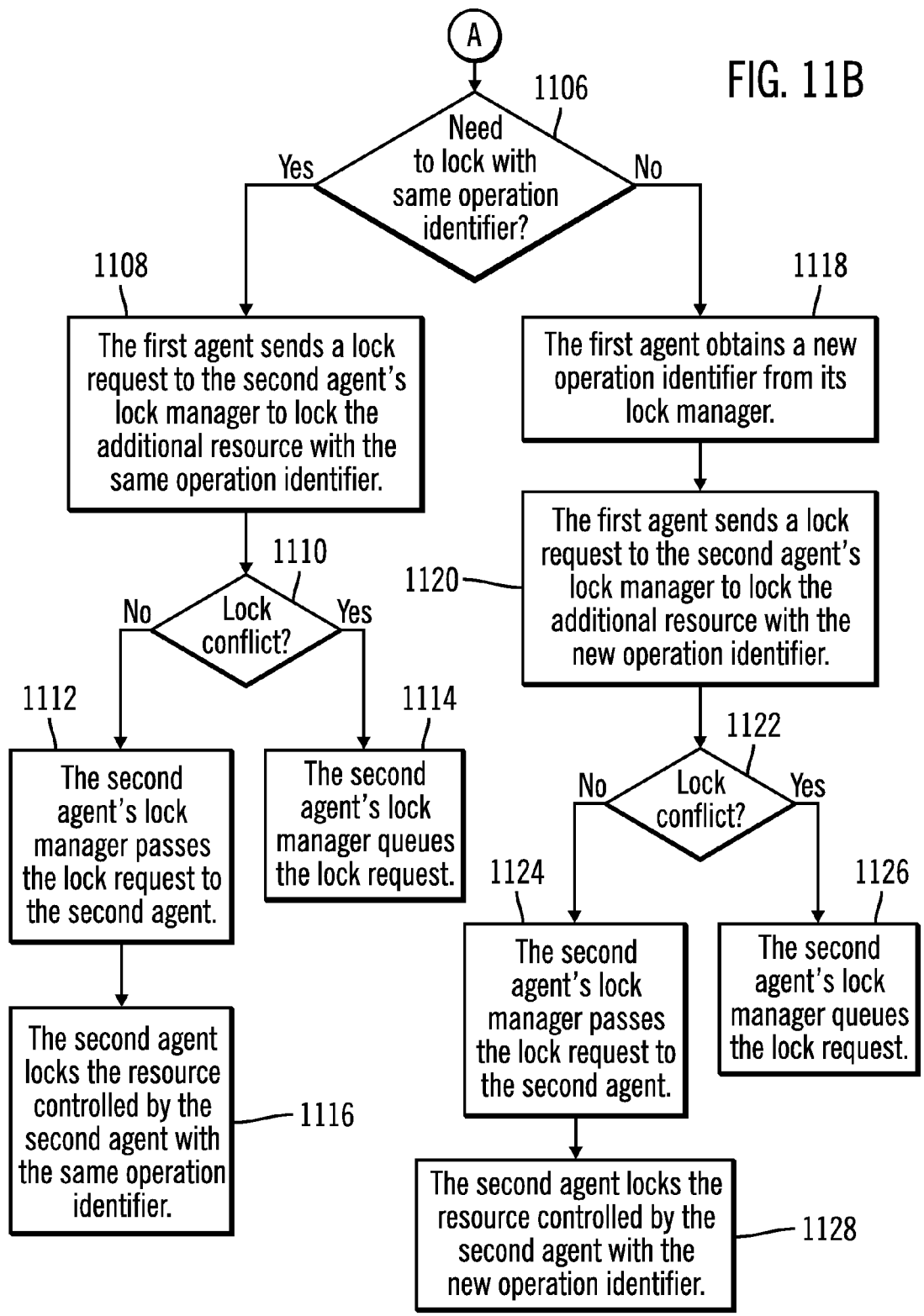

FIGS. 11A and 11B illustrate logic performed by cascading agents when determining which operation identifier is to be used to lock a resource in accordance with certain implementations of the invention. In FIG. 11A, control begins at block 1100 with a first agent receiving a lock request for a client with an associated operation identifier to lock a resource controlled by the first agent. The first agent locks the resource controlled by the first agent with the operation identifier associated with the client (block 1102). That is, the lock is associated with the operation identifier that is associated with the client. If another request to lock the resource with the same operation identifier is received, the lock request is granted.

The first agent determines whether an additional resource controlled by a second agent should be locked with the same operation identifier to process the client's request based on whether the operation to be performed on the second agent must complete by the time the client's request completes (block 1104). That is, if the operation to be performed on the second agent must complete by the time the client's request completes, then the additional resource controlled by the second agent is locked with the same operation identifier. In block 1106, if it has been determined that the additional resource should be locked with the same operation identifier, processing continues to block 1108, otherwise, processing continues to block 1118.

In block 1108, the first agent sends a lock request to the second agent's lock manager to lock the additional resource with the same operation identifier. In block 1110, the second agent's lock manager determines whether a lock conflict exists. If a lock conflict exists, processing continues to block 1114, otherwise, processing continues to block 1112. In block 1114, the second agent's lock manager queues the lock request. In block 1112, the second agent's lock manager passes the lock request to the second agent. The second agent locks the resource controlled by the second agent with the same operation identifier (block 1116).

In block 1118, the first agent obtains a new operation identifier from its lock manager. The first agent sends a notification to the second agent's lock manager to lock the additional resource with the new operation identifier (block 1120). In block 1122, the second agent's lock manager determines whether a lock conflict exists. If a lock conflict exists, processing continues to block 1126, otherwise, processing continues to block 1124. In block 1126, the second agent's lock manager queues the lock request. In block 1124, the second agent's lock manager passes the lock request to the second agent. The second agent locks the resource controlled by the second agent with the new operation identifier (block 1128).

Figure 11C:
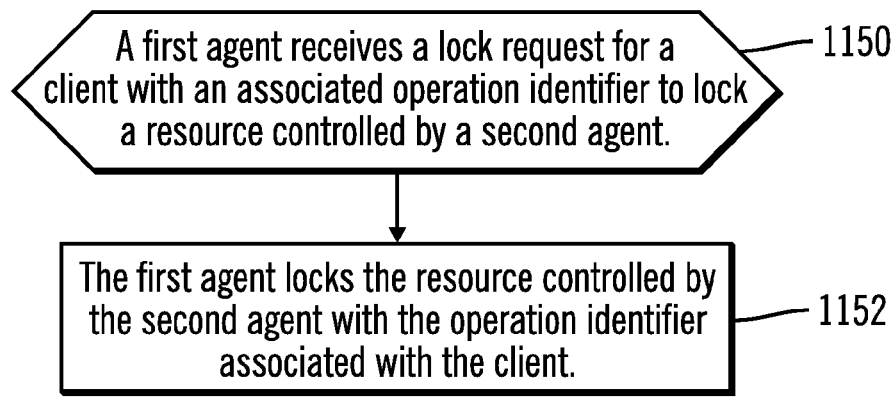
FIGS. 11C and 11D illustrate logic performed by cascading agents when a first agent locks a resource controlled by a second agent and the second agent receives another request to lock that resource in accordance with certain implementations of the invention.
Figure 11D:
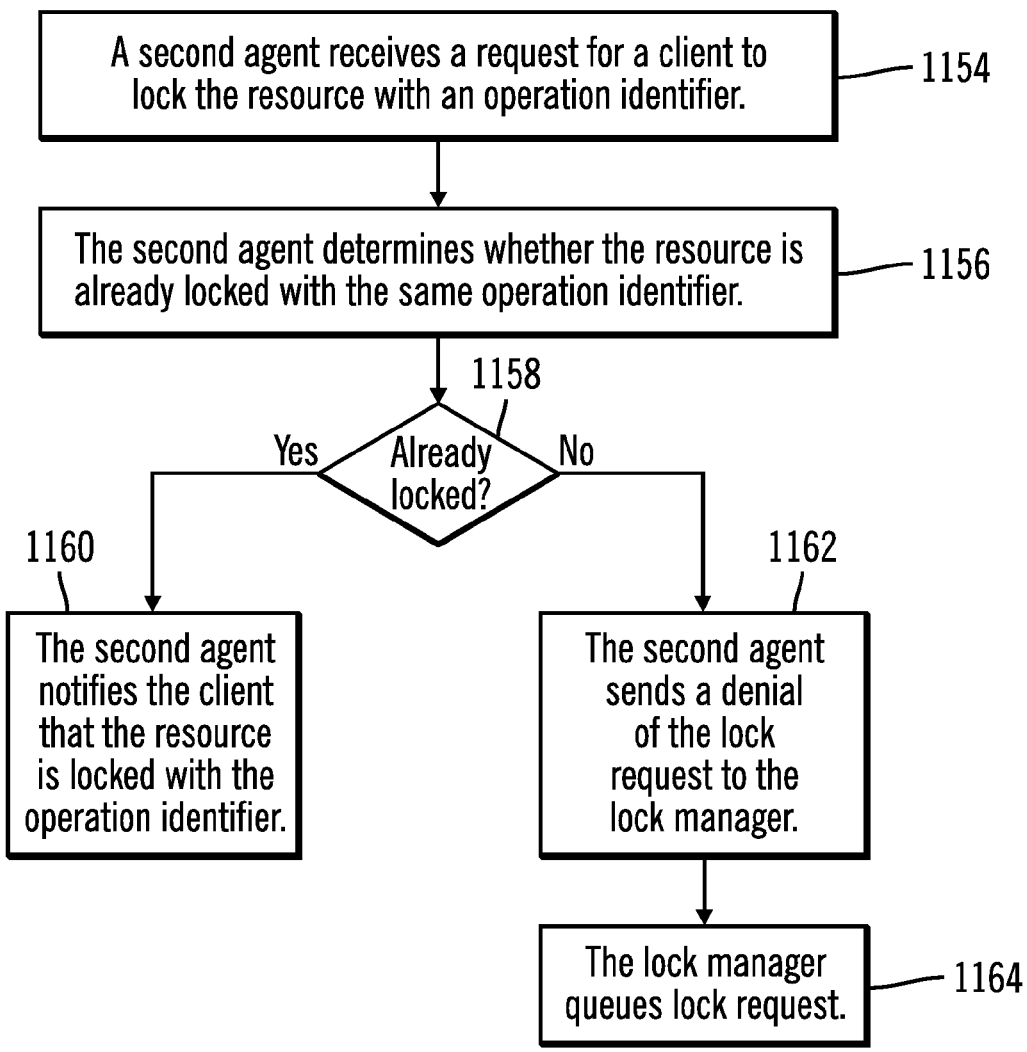

FIGS. 11C and 11D illustrate logic performed by cascading agents when a first agent locks a resource controlled by a second agent and the second agent receives another request to lock that resource in accordance with certain implementations of the invention. In FIG. 11C, control begins at block 1150 with a first agent receiving a request for a client with an associated operation identifier to lock a resource controlled by a second agent. The first agent locks the resource controlled by the second agent with the operation identifier associated with the client (block 1152). In FIG. 11D, control begins at block 1154 with a second agent receiving a request for a client to lock a resource, which is controlled by the second agent, with an operation identifier (block 1154). The second agent determines whether the resource is already locked with the same operation identifier (block 1156). In certain implementations, the second agent determines whether the resource is already locked with the same operation identifier by matching the first operation identifier against an operation identifier used to lock the resource. In block 1158, if the resource is already locked with the same operation identifier, processing continues to block 1160, otherwise, processing continues to block 1162. In block 1160, the second agent notifies the client that the resource is locked with the same operation identifier. In block 1162, the second agent sends a denial of the lock request to its lock manager. In block 1164, the second agent's lock manager queues the lock request.

Figure 12:
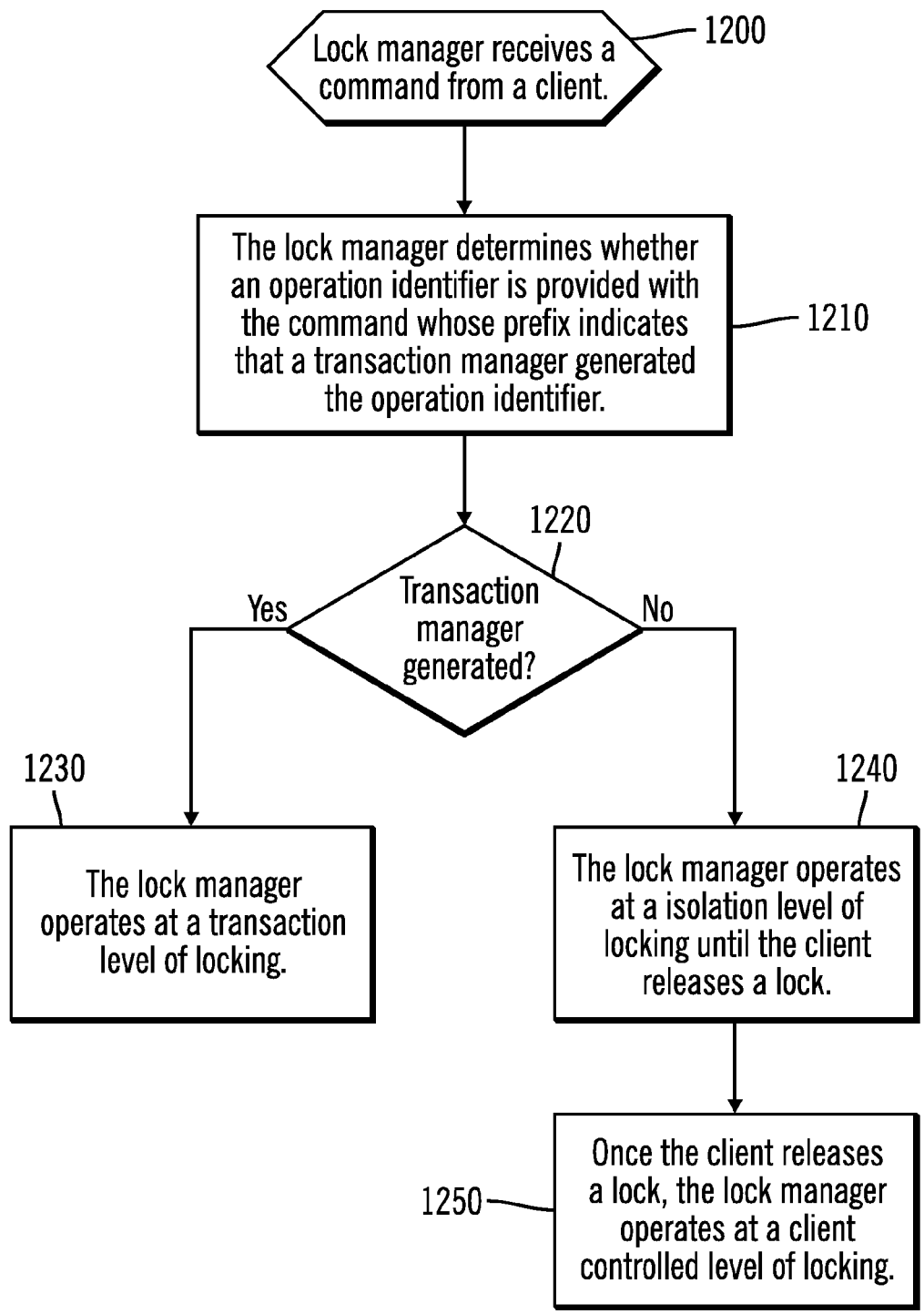
FIG. 12 illustrates logic implemented by a lock manager to allow for different levels of locking by a client in accordance with certain implementations of the invention.
Figure 13:
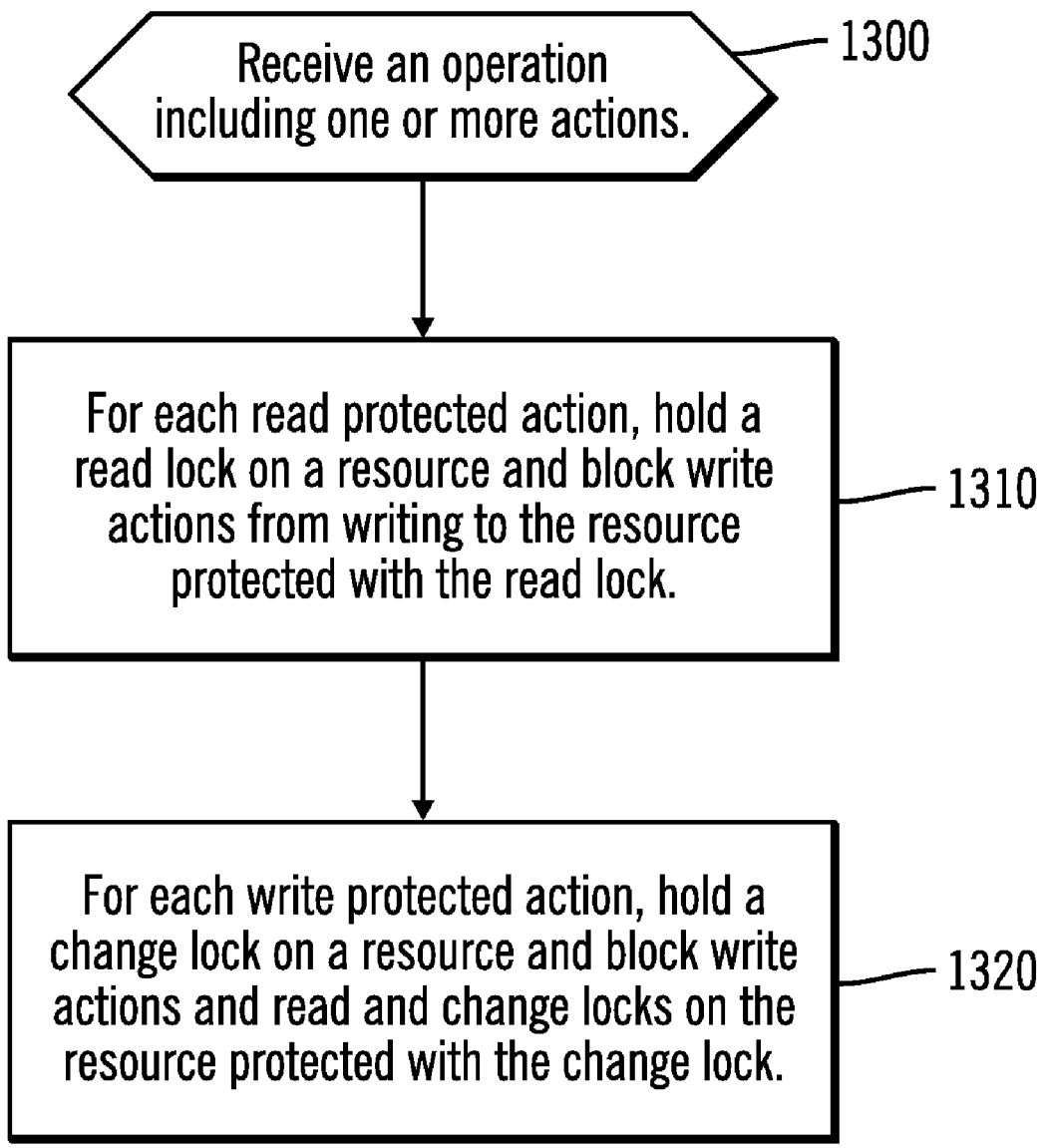
FIG. 13 illustrates logic implemented by an agent in accordance with certain implementations of the invention.

FIG. 12 illustrates logic implemented by a lock manager to allow for different levels of locking by a client in accordance with certain implementations of the invention. Control begins at block 1200 with the lock manager receiving a command from a client. In block 1210, the lock manager determines whether an operation identifier is provided with the command whose prefix indicates that a transaction manager generated the operation identifier. In block 1220, if it is determined that the transaction manager generated the operation identifier, processing continues to block 1230, otherwise, processing continues to block 1240. In block 1230, the lock manager operates at a transaction level of locking. In block 1240, the lock manager operates at an isolation level of locking until the client releases a lock (i.e., any lock). Once the client releases a lock, the lock manager operates at a client controlled level of locking FIG. 13 illustrates logic implemented by an agent in accordance with certain implementations of the invention. Control begins at block 1300 with an agent receiving an operation including one or more actions. The operation is protected across multiple agents from multiple simultaneous non-co-operating clients, wherein an operation comprises one or more actions. In particular, for each read protected action, a read lock is held on a resource and write actions are blocked from writing to the resource protected with the read lock (block 1310). For each write protected action, a change lock is held on a resource and write actions and read and change locks are blocked on the resource protected with the change lock (block 1320).

Figure 14:
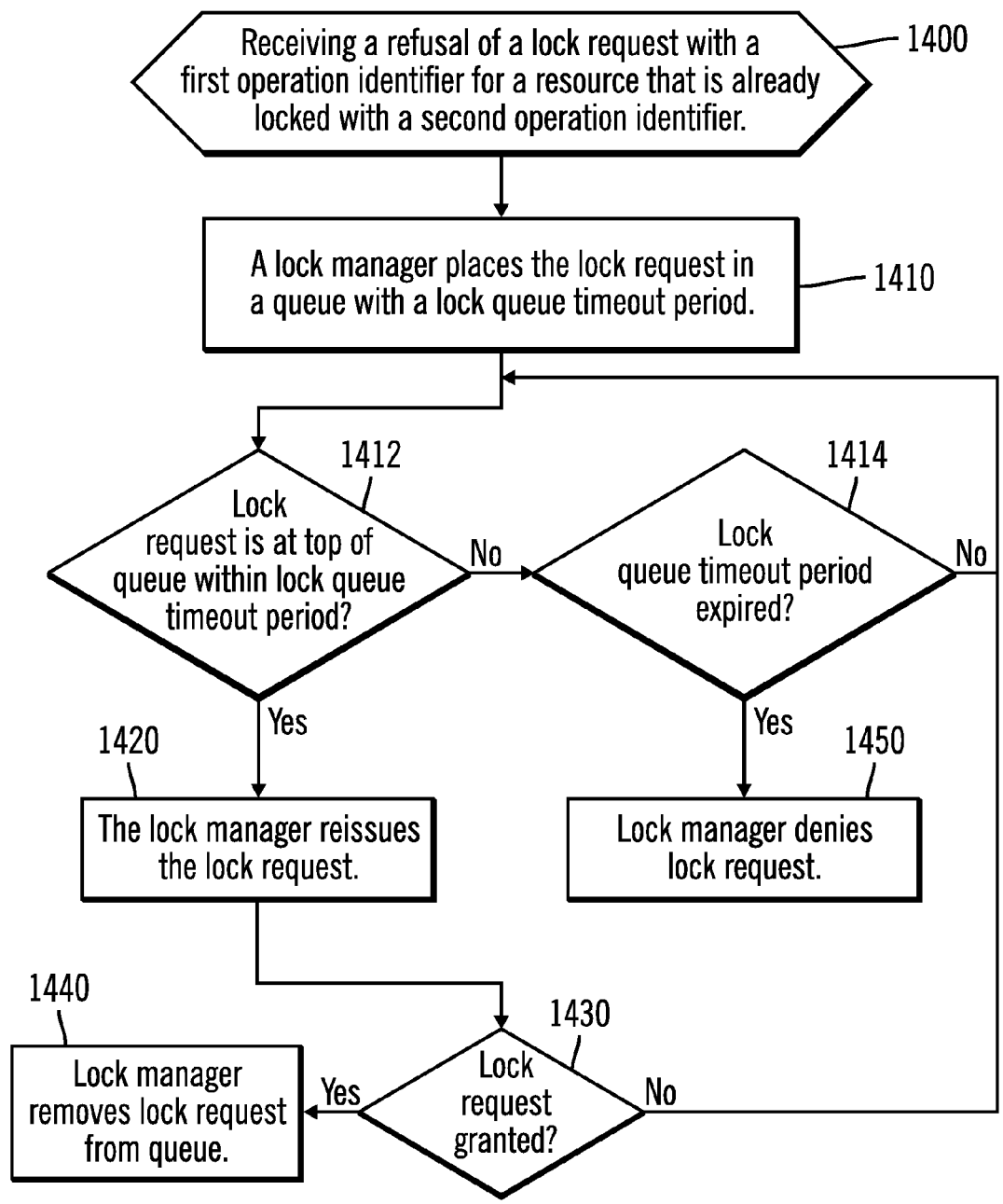
FIG. 14 illustrates logic implemented in a lock manager to resolve deadlocks in accordance with certain implementations of the invention.

FIG. 14 illustrates logic implemented in a lock manager to resolve deadlocks in accordance with certain implementations of the invention. Control begins at block 1400 with a lock manager receiving a refusal of a lock request with a first operation identifier for a resource (e.g., object) that is already locked with a second operation identifier. The lock request was sent by a client and refused by an agent. The lock manager places the lock request in a queue with a lock queue timeout period (block 1410). In block 1412, the lock manager determines whether the lock request is at the top of the queue within the lock queue timeout period. If so, processing continues to block 1420, otherwise, processing continues to block 1414. For ease of reference, the "top" of the queue is used herein to refer to a position of the queue from which the lock request may be processed by the lock manager. In block 1414, the lock manager determines whether the lock queue timeout period expired. If so, processing continues to block 1450, otherwise, processing continues to block 1412.

In block 1420, the lock manager reissues the lock request. In particular, in block 1420, the lock manager reissues the lock request because the lock has been released by a predecessor holding that lock and the queued lock request moved to the top of the queue within its lock queue timeout period. Note that the lock manager processes a queued lock request once it is at the top of the queue. In block 1430, if the lock request was granted within the lock queue timeout period, processing continues to block 1440, otherwise, processing continues to block 1412. In block 1440, the lock manager removes the lock request from the queue. If the lock is not granted, the lock request is re-queued. In this manner, a lock request on a resource that is already locked is either granted at a later time or terminated, avoiding a deadlock situation. In alternative implementations, in block 1410, the lock request may be placed back into the queue based on one or more factors, such as how many times the lock request has been previously placed in the queue.

In particular, when a lock request gets to the top of the queue and is reissued, the lock request is typically granted at a later time. However, there is may be a case in which a locking unaware client obtains the desired lock. So, it is possible that the reissued lock request will get denied by the agent. In this case, the lock request is placed back on the queue and waits for the "locking unaware client lock" to clear. The AgentAvail message that flows from the agent to the lock manager provides an indication of the lock being released by the locking unaware client. When the lock manager gets the AgentAvail message, the lock manager knows that to reissue the lock request or, if the lock request on the queue had timed out, then the lock manager just throws away the message.

Additional Implementation Details

The described techniques for lock and transaction management may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The logic of FIGS. 8-14 describes specific operations occurring in a particular order. In alternative implementations, certain of the logic operations may be performed in a different order, modified or removed. Moreover, steps may be added to the above described logic and still conform to the described implementations. Further, operations described herein may occur sequentially or certain operations may be processed in parallel, or operations described as performed by a single process may be performed by distributed processes.

The logic of FIGS. 8-14 was described as being implemented in software. This logic may be part of the operating system of the host systems or an application program. In yet further implementations, this logic may be maintained in storage areas or in a read only memory or other hardwired type of device. The preferred logic may be implemented in hard disk drives or in programmable and non-programmable gate array logic.

Figure 15:
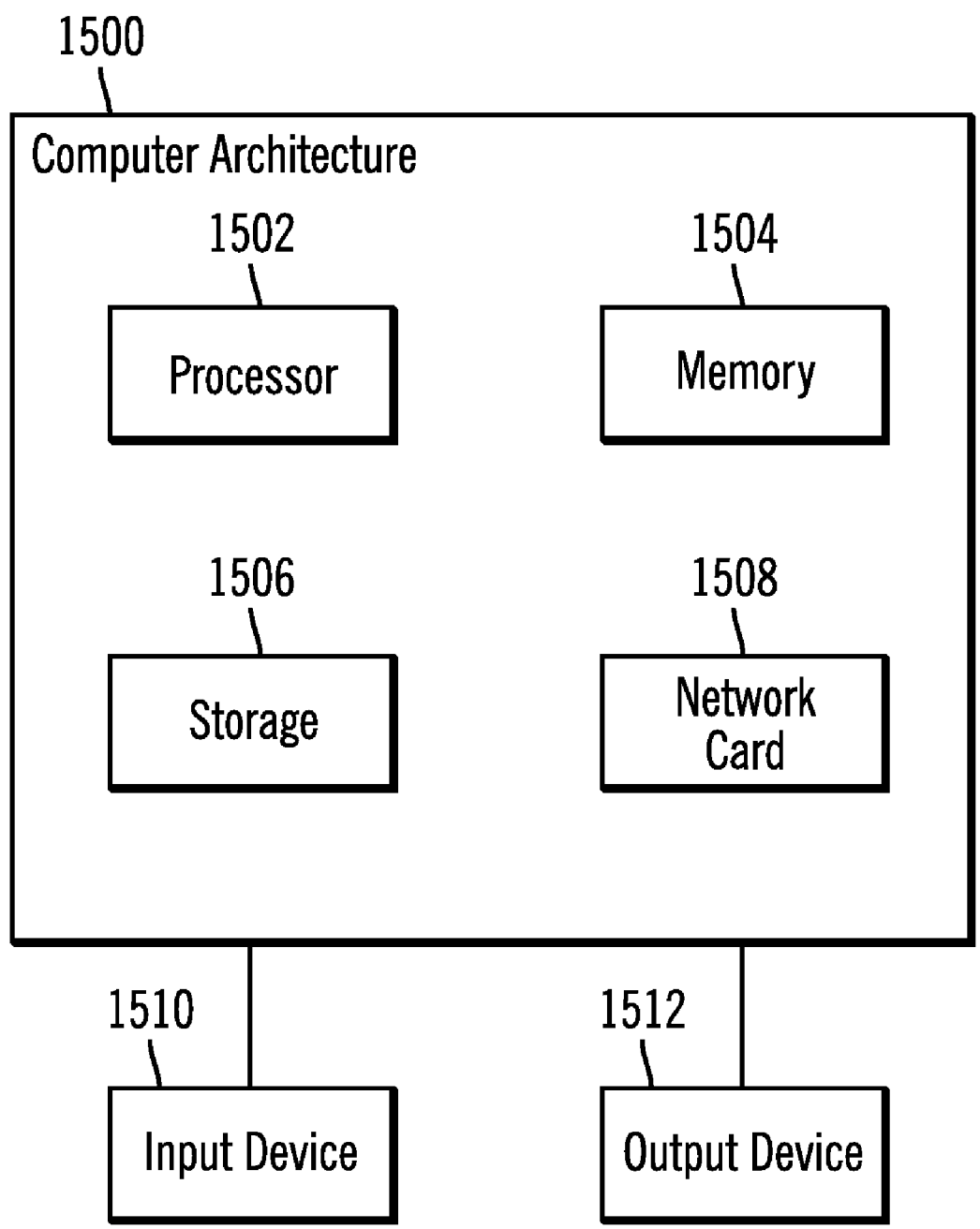
FIG. 15 illustrates an architecture of a locking aware client, a transaction management server, a lock management server, and a lock management agent in accordance with certain implementations of the invention.

FIG. 15 illustrates an architecture of roles 110, 120, 130, 140A . . . N in accordance with certain implementations of the invention. The locking aware client 110, transaction management server 120, lock management server 130, and lock management agents 140A . . . N may each implement a computer architecture 1500 having a processor 1502 (e.g., a microprocessor), a memory 1504 (e.g., a volatile memory device), and storage 1506 (e.g., a non-volatile storage, such as magnetic disk drives, optical disk drives, a tape drive, etc.). The storage 1506 may comprise an internal storage device or an attached or network accessible storage. Programs in the storage 1506 are loaded into the memory 1504 and executed by the processor 1502 in a manner known in the art. The architecture further includes a network card 1508 to enable communication with a network. An input device 1510 is used to provide user input to the processor 1502, and may include a keyboard, mouse, pen-stylus, microphone, touch sensitive display screen, or any other activation or input mechanism known in the art. An output device 1512 is capable of rendering information transmitted from the processor 1502, or other component, such as a display monitor, printer, storage, etc.

The foregoing description of the preferred implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for lock management, comprising:
under control of a lock manager that manages lock requests received from one or more multi-vendor clients and directed to one or more multi-vendor locking agents and manages responses from the one or more multi-vendor locking agents to the one or more multi-vendor clients,
receiving lock requests from a locking aware client among the multi-vendor clients;
determining that the lock requests have been refused by the one or more multi-vendor locking agents; and
for the locking aware client, performing lock request queuing for the lock requests; and
under control of a locking aware agent,
receiving a request to access a resource from a locking unaware client among the multi-vendor clients, wherein the locking unaware client does not perform locking;
determining whether the locking aware agent can access the device; and
in response to determining that the locking aware agent can access the device,
obtaining a lock to execute the request;
releasing the lock when the request has been executed; and
notifying the lock manager that the resource is available for locking.

2. The method of claim 1, further comprising:
maintaining state information, wherein the state information includes locks held by the one or more multi-vendor clients and identifies the one or more multi-vendor locking agents holding locks, wherein the state information reflects states of the one or more multi-vendor clients and the one or more multi-vendor locking agents.

3. The method of claim 1, further comprising:
enforcing a locking protocol that defines interactions between the lock manager, the multi-vendor clients, and the multi-vendor locking agents.

4. The method of claim 1, further comprising:
receiving a read protected action on the resource;
holding a read lock on the resource; and
blocking write actions from writing to the resource.

5. The method of claim 1, further comprising:
receiving a write protected action on the resource;
holding a change lock on the resource;
blocking write actions from writing to the resource; and
blocking read and change locks on the resource.

6. The method of claim 1, further comprising:
under control of the lock manager, performing functions to ensure that the one or more multi-vendor clients and the one or more multi-vendor locking agents are functioning properly by sending a signal to one of the one or more multi-vendor clients and the one or more multi-vendor locking agents and receiving a response to the signal that indicates proper functioning.

7. A system for lock management, comprising:
a processor;
a computer readable medium accessible to the processor;
under control of a lock manager that manages lock requests received from one or more multi-vendor clients and directed to one or more multi-vendor locking agents and manages responses from the one or more multi-vendor locking agents to the one or more multi-vendor clients, code causing the processor to:
receive lock requests from a locking aware client among the multi-vendor clients;
determining that the lock requests have been refused by the one or more multi-vendor locking agents; and
for the locking aware client, perform lock request queuing for the lock requests; and
under control of a locking aware agent, code causing the processor to:
receive a request to access a resource from a locking unaware client among the multi-vendor clients, wherein the locking unaware client does not perform locking;
determining whether the locking aware agent can access the device; and
in response to determining that the locking aware agent can access the device,
obtain a lock to execute the request;
release the lock when the request has been executed; and
notify the lock manager that the resource is available for locking.

8. The system of claim 7, wherein the code causes the processor to further perform:
maintaining state information, wherein the state information includes locks held by the one or more multi-vendor clients and identifies the one or more multi-vendor locking agents holding locks, wherein the state information reflects states of the one or more multi-vendor clients and the one or more multi-vendor locking agents.

9. The system of claim 7, wherein the code causes the processor to further perform:
enforcing a locking protocol that defines interactions between the lock manager, the multi-vendor clients, and the multi-vendor locking agents.

10. The system of claim 7, wherein the code causes the processor to further perform:
receiving a read protected action on the resource;
holding a read lock on the resource; and
blocking write actions from writing to the resource.

11. The system of claim 7, further comprising:
means for receiving a write protected action on the resource;
means for holding a change lock on the resource;
means for blocking write actions from writing to the resource; and
means for blocking read and change locks on the resource.

12. The system of claim 7, wherein the code causes the processor to further perform:
under control of the lock manager, performing functions to ensure that the one or more multi-vendor clients and the one or more multi-vendor locking agents are functioning properly by sending a signal to one of the one or more multi-vendor clients and the one or more multi-vendor locking agents and receiving a response to the signal that indicates proper functioning.

13. An article of manufacture comprising a computer readable storage medium storing a program for lock management, wherein the program, when executed by a processor of a computer, causes operations to be performed, the operations comprising:
under control of a lock manager that manages lock requests received from one or more multi-vendor clients and directed to one or more multi-vendor locking agents and manages responses from the one or more multi-vendor locking agents to the one or more multi-vendor clients,
receiving lock requests from a locking aware client among the multi-vendor clients;
determining that the lock requests have been refused by the one or more multi-vendor locking agents; and
for the locking aware client, performing lock request queuing for the lock requests; and
under control of a locking aware agent,
receiving a request to access a resource from a locking unaware client among the multi-vendor clients, wherein the locking unaware client does not perform locking;
determining whether the locking aware agent can access the device; and
in response to determining that the locking aware agent can access the device,
obtaining a lock to execute the request;
releasing the lock when the request has been executed; and
notifying the lock manager that the resource is available for locking.

14. The article of manufacture of claim 13, the operations further comprising:
maintaining state information, wherein the state information includes locks held by the one or more multi-vendor clients and identifies the one or more multi-vendor locking agents holding locks, wherein the state information reflects states of the one or more multi-vendor clients and the one or more multi-vendor locking agents.

15. The article of manufacture of claim 13, the operations further comprising:
enforcing a locking protocol that defines interactions between the lock manager, the multi-vendor clients, and the multi-vendor locking agents.

16. The article of manufacture of claim 13, the operations further comprising:
receiving a read protected action on the resource;
holding a read lock on the resource; and
blocking write actions from writing to the resource.

17. The article of manufacture of claim 13, the operations further comprising:
receiving a write protected action on the resource;
holding a change lock on the resource;
blocking write actions from writing to the resource; and
blocking read and change locks on the resource.

18. The article of manufacture of claim 13, the operations further comprising:
under control of the lock manager, performing functions to ensure that the one or more multi-vendor clients and the one or more multi-vendor locking agents are functioning properly by sending a signal to one of the one or more multi-vendor clients and the one or more multi-vendor locking agents and receiving a response to the signal that indicates proper functioning.

* * * * *